(12) United States Patent
Kageyama et al.

(10) Patent No.: US 6,246,932 B1
(45) Date of Patent: Jun. 12, 2001

(54) VEHICLE MONITOR FOR CONTROLLING MOVEMENTS OF A PLURALITY OF VEHICLES

(75) Inventors: Masato Kageyama, Oyama; Masanori Tojima, Kawasaki; Kiyoshi Kaneko, Urawa; Kazunori Kuromoto, Yokohama; Tomonori Ozaki, Kawasaki, all of (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/367,641

(22) PCT Filed: Feb. 12, 1998

(86) PCT No.: PCT/JP98/00562

§ 371 Date: Aug. 19, 1999

§ 102(e) Date: Aug. 19, 1999

(87) PCT Pub. No.: WO98/37468

PCT Pub. Date: Aug. 27, 1998

(30) Foreign Application Priority Data

Feb. 20, 1997 (JP) .................................................. 9-036324

(51) Int. Cl.⁷ ....................................................... G05D 1/02
(52) U.S. Cl. ............................... 701/24; 701/117; 701/50; 340/992
(58) Field of Search .................................. 701/2, 24, 117, 701/217, 300, 25, 50; 340/989, 992; 342/357.07

(56) References Cited

U.S. PATENT DOCUMENTS

| | | | |
|---|---|---|---|
| 5,586,030 | * 12/1996 | Kemner et al. | 701/23 |
| 5,625,559 | * 4/1997 | Egawa | 701/117 |
| 5,925,081 | * 7/1999 | Hawkins et al. | 701/24 |
| 5,956,250 | * 9/1999 | Gudat et al. | 318/587 |

FOREIGN PATENT DOCUMENTS

| | | |
|---|---|---|
| 61-262903 | 11/1986 | (JP) . |
| 63-150709 | 6/1988 | (JP) . |
| 63-150710 | 6/1988 | (JP) . |
| 63-268008 | 11/1988 | (JP) . |
| 1-253010 | 10/1989 | (JP) . |
| 3-292511 | 12/1991 | (JP) . |
| 6-208413 | 7/1994 | (JP) . |
| 8-263138 | 10/1996 | (JP) . |

* cited by examiner

*Primary Examiner*—Michael J. Zanelli
(74) *Attorney, Agent, or Firm*—Varndell & Varndell, PLLC

(57) ABSTRACT

This invention is a vehicle monitor for avoiding interference between vehicles, etc., without incurring cost increases for deploying auxiliary equipment at a wide-area site, while imposing only low loads on communication lines and monitoring stations, without impairing safety, and while realizing high flexibility for modifications of planned travelling paths. This system can also cope with various forms of interference which can occur throughout the entire planned travelling paths. In the system of the present invention, transceiver devices are provided in the monitoring station and in a plurality of vehicles, respectively, for sending and receiving position data and directive data between the monitoring station and the plurality of vehicles, using a communication system wherewith radio-communication is possible over the distances between the monitoring station and the plurality of vehicles. The planned travelling paths are divided into a plurality of segments and position data are transmitted, using the transceiver devices provided respectively in the plurality of vehicles, to the monitoring station every time a vehicle reaches a division point on the planned travelling paths, whereby, in the monitoring station, determinations are made as to which segment on the planned travelling paths each of the plurality of vehicles is present in, and directive data are transmitted to the vehicles according to the results of those determinations.

19 Claims, 13 Drawing Sheets

VEHICLE MONITOR FOR CONTROLLING MOVEMENTS OF A PLURALITY OF VEHICLES

TECHNICAL FIELD

This invention relates to a vehicle monitor for measuring current positions of own vehicles, making comparisons between those measured current vehicle positions and target positions on planned travelling paths that are taught, and monitoring a plurality of vehicles traveling along those planned travelling paths while making those comparisons, and particularly to such a vehicle monitor that monitors a plurality of vehicles so that those vehicles do not interfere with each other.

BACKGROUND ART

Vehicle monitoring systems are configured for the purpose of controlling the operations of multiple unmanned dump trucks or the like doing work such as hauling earth and sand over spacious work sites such as at rock crushing or mining facilities, wherein a monitoring station is established as a ground station and the unmanned vehicles are comprehensively controlled and monitored by the monitoring station.

Conventionally, such vehicle monitoring systems have been devised so that transceivers (VHF transceivers, for example) are provided for conducting radio communications between the monitoring station and the plurality of vehicles, various kinds of data including position data for own vehicles measured by each of those vehicles are transmitted to the monitoring station at extremely short intervals (such as every second, for example), whereby the positions of each vehicle can be accurately apprehended in the monitoring station so that collisions, etc., do not occur between the vehicles. The monitoring station that receives the position data, etc., transmitted by the vehicles sends data back to the vehicles to acknowledge receipt of their transmissions, whereby each vehicle can verify any malfunction in the transceiver carried thereby.

In recent years, however, a need has arisen to monitor a greater number of vehicles (50 to 100) in applications where the distances traveled by the vehicles are extremely long (approximately 10 km or so), and where a plurality of travel routes exist. In conjunction with this development, the data volume handled has increased dramatically.

In order to cope with this, it is necessary to provide transceivers of a type capable of performing high-speed radio communication over a wide area (i.e. long-distances).

The following two communication systems are thought to be practical, using current technology, for such vehicle monitoring.

(1) VHF/UHF (2) SS (spectrum spread system) radio

However, when the VHF/UHF system is employed in the vehicle monitoring system described in the foregoing, although this communication system is capable of communicating over long distances (10 to 20 km) and thus to cover communication over the entire area of a wide work site, the communication speed is slow (9600 bps), resulting in the problem of not being able to continually ascertain the current positions of a plurality of vehicles. That is, such an application involves communicating large volumes of data from the plurality of vehicles to the monitoring station, whereupon the communication data volume becomes large. When this is handled in a communication system wherewith the communication speed is slow, the communication lines become congested, and the load on the communication lines becomes great, to the point where vehicle control and monitoring become truly impossible.

When SS radio ((2) above) is employed in a vehicle monitoring system, moreover, while high-speed communication does indeed become possible (at 256 Kbps), and an extremely large volume of data can be transmitted at high speed, the effective distance of the radio signal is short (100 m to 1 km), so that it is impossible therewith to cover communication over the entire areas of the work sites which are becoming increasingly extensive in area.

Furthermore, in order to cover communication over the entire area of a wide-area work site with SS radio, auxiliary equipment such as radio relay stations must be newly installed in various locations throughout the work site in order to make up for the inadequacy in effective radio signal distance. This results in escalating costs for the initial investment and for maintenance, etc., making practical applications in fact unfeasible.

Thereupon, conventionally, even while employing communication system (1) above, a method has been adopted wherein, in order to augment the vehicle control which the monitoring station is supposed to perform, obstacle sensors are installed in each vehicle so that thereby the presence of other vehicles can be ascertained and collisions avoided. However, collision avoidance systems which depend on such sensors are problematic in terms of safety and so are fundamentally undesirable. This is because of the difficulty in completely avoiding all collisions in cases where multiple vehicles must transit intersections and pass each other from opposite directions.

Furthermore, whether communication system (1) or communication system (2) above is employed, a problem nevertheless remains in that the monitoring station must control all of the vehicles, wherefore the burden placed on the monitoring station becomes excessive.

Thus, conventionally, despite the fact that large volumes of data must be handled, due to problems inherent in the communication scheme of the system, the number of vehicles controllable by the monitoring station has been limited.

In order to resolve these problems, a method has been proposed wherewith vehicle positions are monitored by providing monitoring posts for monitoring the passage of vehicles at various places along the planned travelling path.

However, the installation of auxiliary equipment such as monitoring posts at locations along extensive planned travelling paths involves enormous installation costs, and such measures provide little flexibility for altering a planned travelling path because the positions of the monitoring posts must be changed every time the planned travelling path is altered. Hence this method is problematic in terms of both practicality and convenience.

The present invention was devised in view of the situation described in the foregoing. An object of the present invention is to perform vehicle monitoring wherewith inter-vehicular interference is avoided, without entailing increased costs for deploying auxiliary equipment, and without compromising safety, while minimizing the load on the communication lines and the load on the-monitoring station, and providing high flexibility for making alterations in the planned travelling path.

There have been problems with conventional methods for avoiding vehicular interference at wide-area work sites in that the areas where interference is to be avoided and the form of interference have been limited.

With the "Unmanned Dump Truck Work Area Intrusion Interlock Method and System Therefor" disclosed in Japanese Patent Application Laid-Open No. 198134/1997, for example, the places where interference can be avoided are limited to work areas such as loading sites. Accordingly, as based on this technology, inter-vehicular interference cannot be prevented throughout the entire planned travelling paths over which the vehicles must travel.

The technology disclosed in the patent application cited above, moreover, has in view a particular form, that is, the avoidance of interference that occurs when multiple dump trucks make simultaneous incursions.

In large-scale sites such as mining facilities, however, the forms of interference which can occur are various. Interference (collisions) can occur, for example, where multiple vehicles enter an intersection or loading area at the same time, or where there are multiple vehicles traveling in the same direction on the same travel route at different speeds. At sites such as mining facilities, in particular, the weight of the vehicles differs depending on the volume of earth loaded, whereupon the inter-vehicle speed difference often becomes large, making it critically necessary to avoid interference (collisions) caused by the inter-vehicle speed differences.

Another object of the present invention, which was devised in view of the situation described above, in addition to the object stated earlier, is to make it possible to deal with various forms of interference that can occur over the entirety of the planned travelling paths.

DISCLOSURE OF THE INVENTION

Thereupon, a first invention of the present invention is a vehicle monitor comprising a plurality of vehicles each equipped with vehicle position measurement means for measuring current position of that own vehicle, and with travel-guidance means for guiding that own vehicle so that it travels along a taught planned travelling path while comparing the current vehicle position measured against a target position on the taught planned travelling path; and a monitoring station that receives position data transmitted by each of the plurality of vehicles and, based on those received position data, transmits directive data for directing the travel of the plurality of vehicles while monitoring the positional interrelationships between the plurality of vehicles; characterized in that transceiver means are provided in the monitoring station and in each of the plurality of vehicles, respectively, for sending and receiving the position data and the directive data between the monitoring station and the plurality of vehicles, using a communication system capable of radio communication over distances between the monitoring station and the plurality of vehicles, wherein the planned travelling paths are divided into a plurality of segments, determinations are made, in the monitoring station, as to which of the segments of the planned travelling paths each of the plurality of vehicles is present in, by causing the position data to be transmitted to the monitoring station by the transceiver means provided in each of the plurality of vehicles each time a vehicle reaches a dividing point on the planned travelling paths, and directive data are transmitted to each vehicle according to the results of those determinations.

Thus long-distance communication between the monitoring station and the plurality of vehicles can be conducted by the transceiver means (in VHF/UHF system, for example) without giving rise to the cost increases associated with the deployment of auxiliary equipment. Because installation of monitoring posts along the planned travelling paths is unnecessary, flexibility for altering those planned travelling paths is enhanced. The only load on the monitoring station is that of transmitting at least the directive data via the transceiver means, while, from the plurality of vehicles, position data are transmitted to the monitoring station at intervals that are longer than conventionally, that is, every time a dividing point in the planned travelling paths is passed, whereby the positional relationships between the plurality of vehicles is ascertained by the monitoring station and directive data are transmitted to the vehicles for preventing interference, etc. Hence vehicle monitoring can be conducted to avoid inter-vehicular interference, etc., such that the frequentness of communication between the monitoring station and the plurality of vehicles can be reduced, and the loads placed both on the monitoring station and on the communication lines is reduced, while maintaining safety without reliance on obstacle sensors.

A second invention is the first invention, wherein the monitoring station comprises mobile stations provided in the plurality of vehicles.

A third invention is the first invention, wherein predictions are made in the monitoring station as to whether or not two or more vehicles will be present simultaneously in the same segment of the planned travelling paths, and, as a result thereof, when it is predicted that two or more vehicles will be present simultaneously in the same segment, directive data are transmitted to those two or more vehicles in order to avoid inter-vehicular interference.

A fourth invention is the first invention, wherein the lengths of the segments in the planned travelling paths are established in lengths that are never shorter than the stopping distances of the plurality of vehicles.

A fifth invention is the first invention, wherein each of the plurality of vehicles is equipped with an obstacle sensor for detecting obstacles, and the lengths of the segments in the planned travelling paths are established so that they are never shorter than the effective detection distances of the obstacle sensors.

A sixth invention is the first invention, wherein at least one of the plurality of vehicles is a manned vehicle, in which manned vehicle are provided display means for displaying the particulars of the directive data transmitted from the monitoring station, and also means for automatically executing the particulars of the directive data when the particulars of the directive data have not been executed before a prescribed length of time has elapsed since the display of the directive data on the display means.

A seventh invention is a vehicle monitor comprising a plurality of vehicles each equipped with vehicle position measurement means for measuring current position of that own vehicle, and with manual or automatic travel-guidance means for guiding that own vehicle so that it travels along a taught planned travelling path while comparing the current vehicle position measured against a target position on the taught planned travelling path; and a monitoring station that receives position data transmitted by each of the plurality of vehicles and, based on those received position data, transmits directive data for directing the travel of the plurality of vehicles while monitoring the positional interrelationships between the plurality of vehicles; characterized in that first transceiver means are provided in the monitoring station and in each of the plurality of vehicles for sending and receiving the position data and the directive data between the monitoring station and the plurality of vehicles, and the monitoring station is configured so that, for each vehicle, the current position and the current direction of advance on the planned travelling paths are found, based on the position data transmitted from the plurality of vehicles, respectively, via the first transceiver means, so that, for each vehicle, an allowable travel sector on the planned travelling paths wherein no interference with other vehicles will occur is found, and so that directive data directing each such vehicle to travel over that allowable travel sector are transmitted to the vehicles via the first transceiver means.

In the seventh invention, as in the first to sixth inventions described earlier, long-distance communication between the monitoring station and the plurality of vehicles are conducted by the first transceiver means (in the VHF/UHF system, for example) without giving rise to the cost increases associated with the deployment of auxiliary equipment. Because installation of monitoring posts along the planned travelling paths is unnecessary, flexibility for altering those planned travelling paths is enhanced.

By transmitting "directive data directing travel over allowable travel sectors on the planned travelling paths wherein no interference with other vehicles will occur" to the vehicles from the monitoring station, it is possible with one transmission to provide the vehicles with directions to travel over distances (allowable travel sectors) that are as long as possible. For this reason, the frequentness of communication between the monitoring station and the plurality of vehicles can be reduced, and the loads both on the monitoring station and on the communication lines can be reduced.

The monitoring station, moreover, is configured to provide travel directives over allowable travel sectors on the planned travelling paths to the vehicles, and interference can be prevented over the entire planned travelling paths without being restricted to limited locations such as work areas. The allowable travel sectors are determined with a view to various different forms of interference that can occur between vehicles, wherefore various kinds of interference can be dealt with, without being limited to any specific form of interference.

An eighth invention is the seventh invention, wherein position data transmission points where the position data are to be transmitted from the vehicles to the monitoring station are established beforehand on the planned travelling paths, and the plurality of vehicles are configured so that they transmit the position data via the first transceiver means to the monitoring station every time they pass one of the position data transmission points on the planned travelling paths.

A ninth invention is the seventh invention, wherein transmission intervals or transmission times for transmissions of the position data to be made from the vehicles to the monitoring station are established beforehand, and the plurality of vehicles are configured so that they transmit the position data via the first transceiver means to the monitoring station, either at every transmission interval, or every time the transmission time is reached.

A tenth invention is the eighth invention, wherein data indicating the position data transmission points are transmitted from the monitoring station to the vehicles via the first transceiver means.

An 11th invention is the ninth invention, wherein data indicating either the transmission interval or transmission time at which the position data are to be transmitted are transmitted from the monitoring station to the vehicles via the first transceiver means.

A 12th invention is the seventh invention, wherein second transceiver means are provided for sending and receiving the position data mutually between the plurality of vehicles, the monitoring station transmits data specifying another vehicle or vehicles wherewith there is a danger of interference with a own vehicle or vehicles, to vehicles for which mutual communications are necessary because of a danger of interference, via the first transceiver means, and the vehicles receiving the data from the monitoring station specifying the other vehicle or vehicles mutually exchange own position data with the other vehicle or vehicles, based on the data specifying the other vehicle or vehicles, via the second transceiver means, so that the own vehicle or vehicles and the other vehicle or vehicles do not interfere.

A 13th invention is the 12th invention, wherein the monitoring station is configured so that, when it is predicted that a plurality of vehicles will simultaneously enter a specific sector, on the planned travelling paths, for which entry is allowed by only one vehicle, directive data indicating that an allowable travel sector inclusive of the specific sector is to be traveled over, together with data specifying the other vehicles predicted to simultaneously enter the specific sector, are transmitted to the plurality of vehicles predicted to simultaneously enter that specific sector, via the first transceiver means, and the vehicles which receive those data specifying the other vehicles from the monitoring station mutually exchange own position data with those other vehicles based on the data specifying those other vehicles, via the second transceiver means, and determine which vehicle is to enter that specific sector first.

A 14th invention is the 12th invention, wherein the monitoring station is configured so that, when it is predicted that a leading vehicle will enter a specific sector, on the planned travelling paths, for which entry is allowed by only one vehicle, before a following vehicle that will enter later, directive data indicating that an allowable travel sector inclusive of the specific sector is to be traveled over, data specifying the leading vehicle, and position data for the leading vehicle are received via the second transceiver means, whereby data directing that the specific sector is to be entered after confirming that the leading vehicle has left the specific sector are transmitted via the first transceiver means to the following vehicle.

A 15th invention is the 13th or the 14th invention, wherein the specific sector is either a sector containing an intersection or a one-way sector.

A 16th invention is the 13th or the 14th invention, wherein the vehicles that mutually exchange own position data via the second transceiver means are a vehicle traveling in the lead on the travel route toward the specific sector, and a following vehicle traveling in the same direction behind the lead vehicle, on the same travel route.

A 17th invention is the 12th invention, wherein, when it is predicted that two vehicles will pass each other in opposite directions on a planned travelling path, the monitoring station transmits, via the first transceiver means, directive data directing that an allowable travel sector containing the predicted point of passing be traveled over, data specifying the other vehicle predicted to be passed at that point of passing, and data directing that the speed should be reduced at that point of passing, to the two vehicles, and the two vehicles are configured so that own position data are mutually exchanged, via the second transceiver means, with the other vehicle, based on data specifying the other vehicle, whereby the reduced speed imposition is released upon confirmation that the two vehicles have indeed passed each other at the predicted point of passing.

An 18th invention is the 12th invention, wherein, when it is predicted that two vehicles will pass each other in opposite directions on a planned travelling path, the monitoring station transmits, via the first transceiver means, directive data directing that an allowable travel sector containing the predicted point of passing be traveled over, and data specifying the other vehicle predicted to be passed at that point of passing, to the two vehicles, and also transmits, to at least one of those two vehicles, data directing that the course be altered toward the shoulder of the road at the point of passing, and the two vehicles are configured so that own position data are mutually exchanged, via the second transceiver means, with the other vehicle, based on data specifying the other vehicle, whereby at least that one vehicle can return to the course held prior to the course change upon confirmation that the two vehicles have indeed passed each other at the predicted point of passing.

A 19th invention is the seventh invention, wherein at least one of the plurality of vehicles is a manned vehicle, in which manned vehicle are provided display means for displaying the particulars of the directive data transmitted from the monitoring station, and also means for automatically executing the particulars of the directive data when at least the particulars of the directive data directing a speed reduction or stop have not been executed before a prescribed length of time has elapsed since the display of the directive data on the display means.

A 20th invention is the seventh invention, wherein the monitoring station comprises mobile stations provided in the plurality of vehicles.

BEST MODE FOR CARRYING OUT THE INVENTION

Aspects of an embodiment of the vehicle monitor of the present invention are now described with reference to the drawings.

Figure 1:
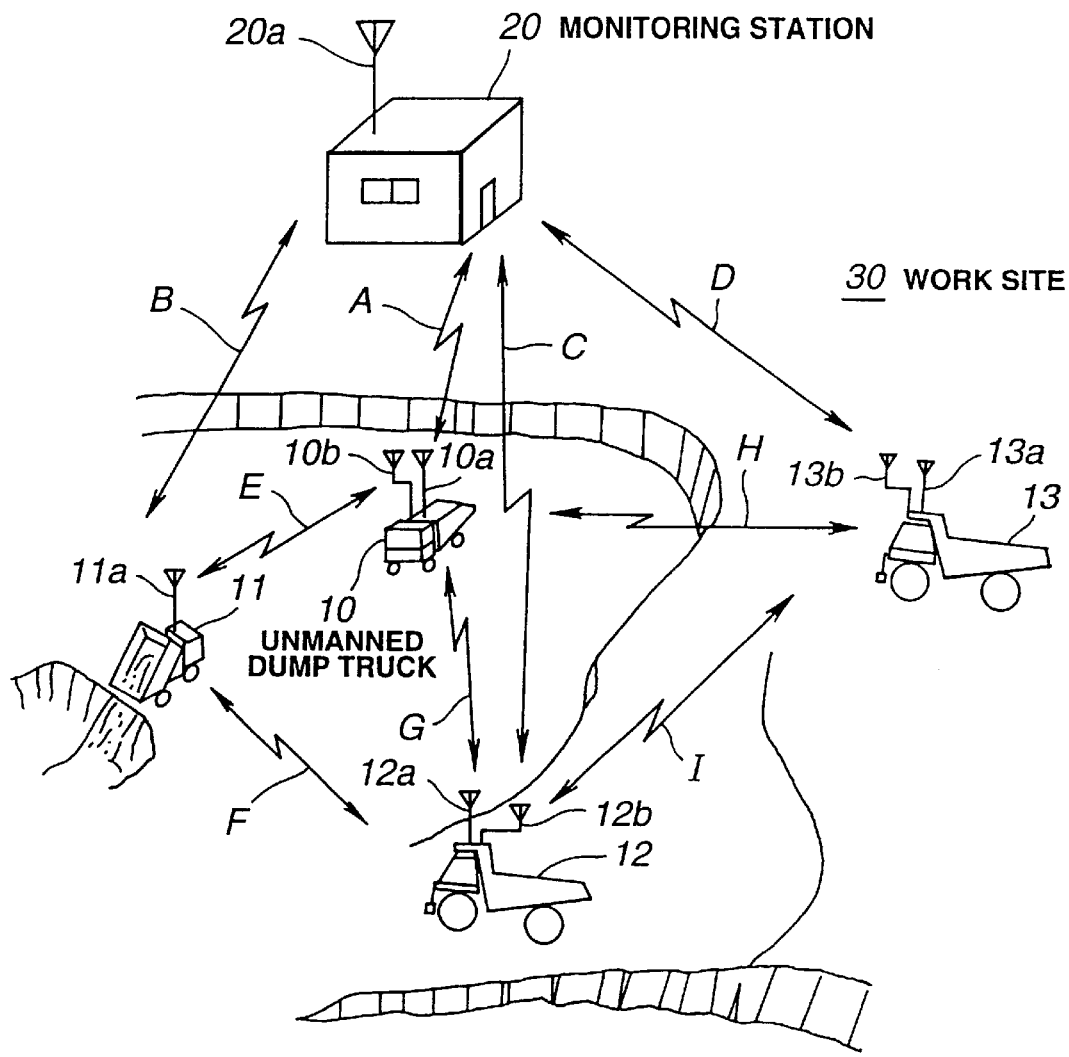
FIG. 1 is a diagram representing an exterior overall view of a dump truck monitoring system that is an embodying aspect of the vehicle monitor of the present invention.

FIG. 1 presents an exterior view of a dump truck monitoring system for controlling and monitoring a plurality of dump trucks 10, 11, 12, 13 . . . at a wide-area work site 30, such as a mining facility, presupposed in this embodying aspect.

Figure 2:
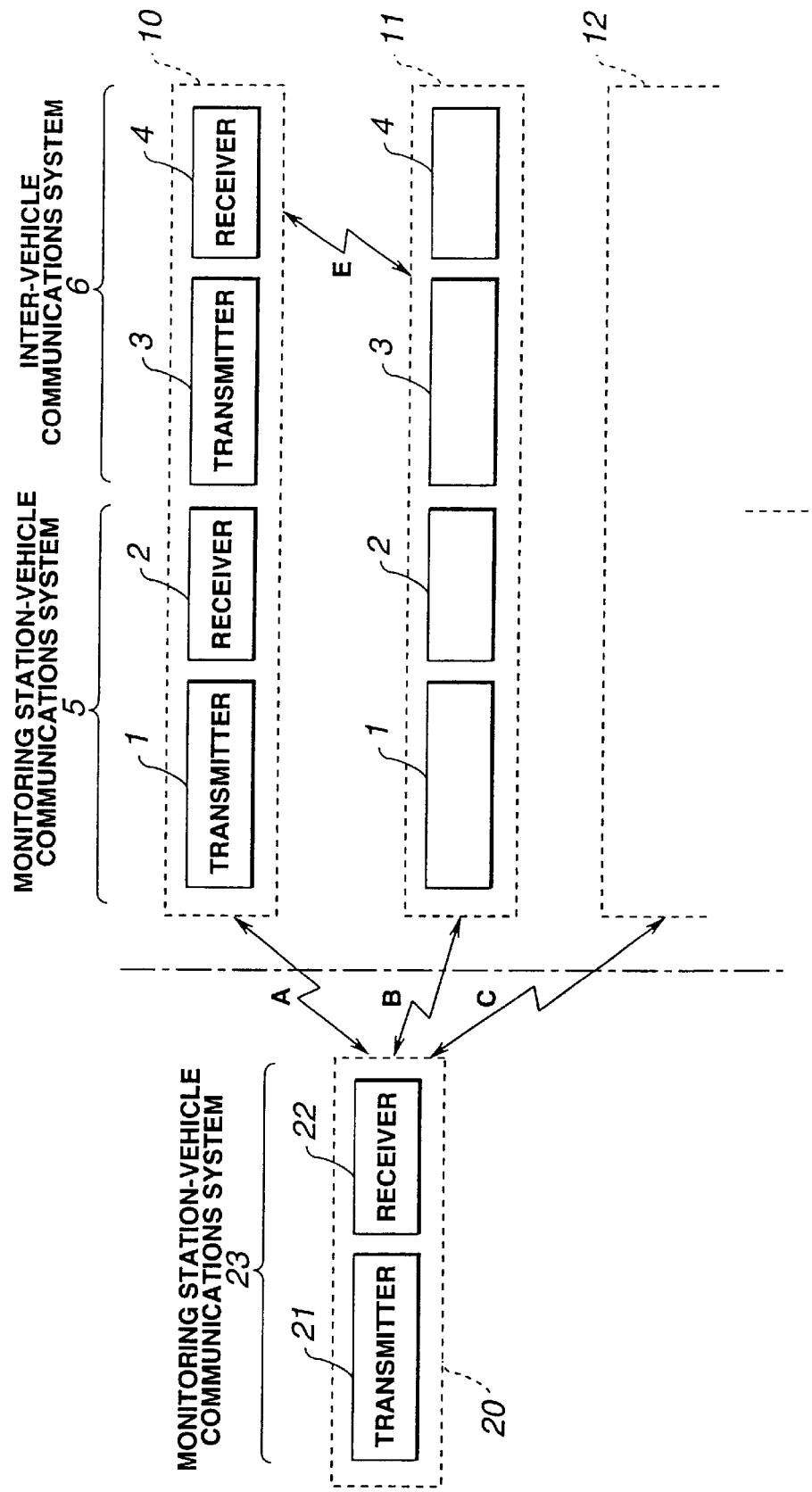
FIG. 2 is a block diagram representing the configuration of a communication network in the embodying aspect.

FIG. 2 is a block diagram representing only a radio communication network as removed from the dump truck monitoring system.

As diagrammed in FIG. 1, this dump truck monitoring system comprises, in the main, a plurality of dump trucks (hereinafter called vehicles) 10, 11, 12, 13 . . . each provided with vehicle position measuring equipment (described subsequently) for measuring own vehicle positions (X, Y), and a monitoring station 20 that receives position data (X, Y) sent from the plurality of vehicles 10 . . . , respectively, and, while monitoring the mutual positional relationships between the plurality of vehicles 10 . . . transmits directive data to the plurality of vehicles 10 . . . for directing them to travel, stop, etc.

This embodying aspect is described with the presupposition of primarily unmanned dump trucks, but application is also possible with manned vehicles, or trucks other than dump trucks, such as wheel loaders, hydraulic shovels, etc. This embodying aspect is also applicable in systems where manned and unmanned vehicles are both present together, and in systems where dump trucks, wheel loaders, and hydraulic shovels, etc., are present together.

As represented in FIG. 2, radio communication are conducted between the monitoring station 20 and the plurality of vehicles 10 . . . by monitoring station-vehicle communication equipment 23 and 5.

More specifically, the monitoring station-vehicle communication equipment 23 and 5 based on a communication system such as VHF, for example, capable of radio communication over the distances between the monitoring station 20 and the plurality of vehicles 10 . . . , that is, over the entire wide-area work site 30, are deployed both in the monitoring station 20 and in the vehicles 10 . . . and the position data and directive data noted earlier are sent and received between the monitoring station 20 and the plurality of vehicles 10 . . . .

The monitoring station-vehicle communication system 23 in the monitoring station 20 comprises a transmitter 21 and a receiver 22, and the monitoring station-vehicle communication system 5 in the vehicle 10 comprises a transmitter 1 and a receiver 2. As diagrammed in FIG. 1, radio communication A is conducted via an antenna 20a at the monitoring station 20 and an antenna 10a on the vehicle 10. Similarly, with the other vehicles, radio communication B is conducted via the antenna 20a at the monitoring station 20 and an antenna 11a on the vehicle 11, radio communication C is conducted via the antenna 20a at the monitoring station 20 and an antenna 12a on the vehicle 12, and radio communication D is conducted via the antenna 20a at the monitoring station 20 and an antenna 13a on the vehicle 13.

Between the plurality of vehicles themselves, radio communications are conducted with an inter-vehicle communication system 6.

In other words, it is possible to conduct radio communications over the distances between the plurality of vehicles themselves. The inter-vehicle communication system 6, which employs a communication system such as SS radio, for example, capable of sending and receiving data at faster speeds than the monitoring station-vehicle communication systems 23 and 5, is installed in each of the vehicles 10, 11, 12, 13 . . ., and the position data noted earlier are sent and received between the plurality of vehicles.

The inter-vehicle communication system 6 in the vehicle 10 . . . comprises a transmitter 3 and a receiver 4, and, as diagrammed in FIG. 1, radio communication E is conducted via the antenna 10b on the vehicle 10 and the antenna 11b on the vehicle 11, radio communication F is conducted via the antenna 11b on the vehicle 11 and the antenna 12b on the vehicle 12, radio communication G is conducted via the antenna 10b on the vehicle 10 and the antenna 12b on the vehicle 12, radio communication H is conducted via the antenna 10b on the vehicle 10 and the antenna 13b on the vehicle 13, and radio communication I is conducted via the antenna 12b on the vehicle 12 and the antenna 13b on the vehicle 13. It may become impossible to conduct radio communication between vehicles separated by distances greater than the effective radio signal distance (as between vehicles 11 and 13, for example).

Reciprocal control between vehicles based on communication with this inter-vehicle communication system 6 does not directly concern the concept of the present invention and is therefore not described here.

It is also possible to embody a communication network comprising only the monitoring station-vehicle communication systems 23 and 5, and thus eliminate the installation of the inter-vehicle communication system 6.

Figure 3:
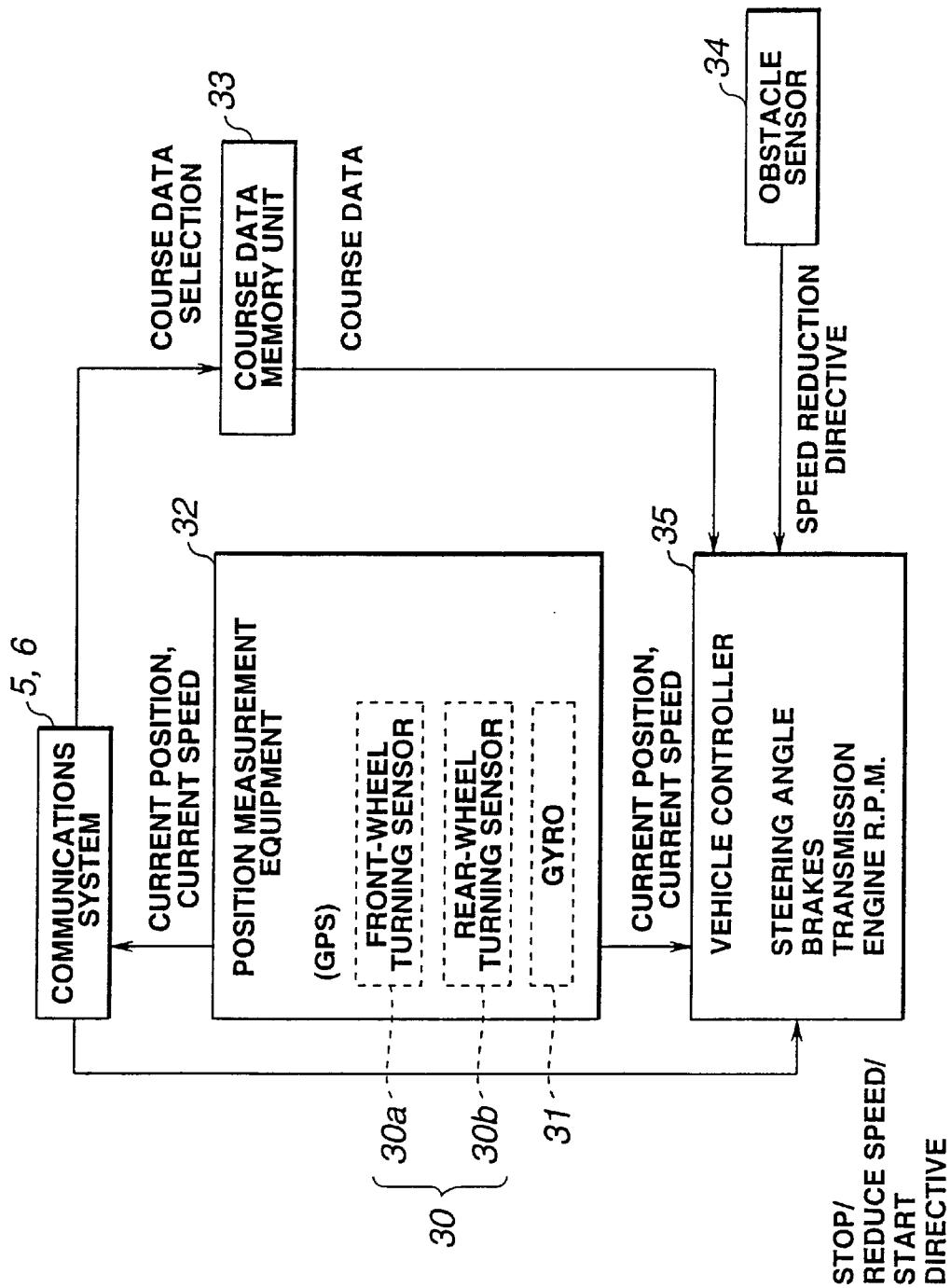
FIG. 3 is a block diagram representing the configuration of equipment carried in an unmanned vehicle in the embodying aspect.

FIG. 3 is a block diagram representing the configuration of equipment carried in the unmanned dump trucks (unmanned vehicles) primarily presupposed in this embodying aspect.

As diagrammed in FIG. 3, this equipment carried in the unmanned vehicles may be roughly described as comprising a CPU at its core, together with position measuring equipment 32 for measuring the current position of a own vehicle (vehicle 10, for example), the communication systems 5 and 6 described earlier, a course data memory unit 33 wherein are stored course data, etc., for indicating a planned travelling path 40, described subsequently, an obstacle sensor 34, described subsequently, and a vehicle controller 35 for drive-controlling the own vehicle 10.

The steering angle, braking, transmission, and engine R.P.M. are controlled by the vehicle controller 35 on the basis of data indicating the current speed and current position of the vehicle 10 measured by the position measuring equipment 32, directive data indicating stopping and speed-reduction directives received by the monitoring station-vehicle 5 from the monitoring station 20, detection signals from the obstacle sensor 34, and the course data stored in the course data memory unit 33.

More specifically, target engine R.P.M. values are set, fuel injection quantities are controlled in response to electrical signals sent to an electronically controlled governor, and the engine R.P.M. is varied. An engine R.P.M. sensor detects the actual engine R.P.M., and this detection signal is used as a feedback signal for controlling engine R.P.M.

If a forward-reverse clutch is in either the forward or reverse condition (not neutral), the engine power is transmitted via a torque converter, transmission, propeller shaft, and differential gears to the tires, and the travelling speed of the vehicle 10 is varied by varying the engine R.P.M.

A hydraulic pump is driven by the engine. The discharge hydraulic pressure from this hydraulic pump is applied to hydraulic actuators that drive a cargo bed, etc., and is also supplied via a proportional steering hydraulic solenoid valve to a steering cylinder that drives the steering. The steering is driven in response to electrical signals applied to a steering-hydraulic-pressure proportional solenoid valve, and the steering angle is varied.

A target brake-pressure value is set, and brakes are activated while varying the brake pressure in response to electrical signals applied to a brake-air-pressure proportional solenoid valve. A brake pressure sensor is installed in the brakes for detecting the brake pressure, and the detection signals thereof are used as feedback signals for controlling brake pressure.

The particulars of what is performed by the position measuring equipment 32 are now described.

Tire turning sensors 30 (such as dial pulse encoders) that are vehicle travel distance detectors are attached to tires on the vehicle 10 for detecting the number of times N these tires turn. These tire turning sensors 30 comprise a front-wheel sensor 30a and a rear-wheel sensor 30b. In the body of the vehicle is installed a gyro 31 (such as an optical fiber gyro) that is a vehicle bearing indicator, for detecting the angular velocity ( of the vehicle attitude angle.

The vehicle position (X, Y) (i.e. position on a two-dimensional system of coordinates X and Y) is detected on the basis of the outputs of these tire turning sensors 30 and gyro 31, as will be described subsequently. This vehicle position contains a cumulative error due to tire slipping, etc., wherefore the cumulative error may be intermittently corrected for, as for example from the relative positional relationship between the vehicle and reflector poles deployed at intervals along the planned travelling path of the vehicle.

Instead of measuring the vehicle position on the basis of the output signals from the tire turning sensors and gyro, as described in the foregoing, the vehicle position may be measured by means of a global positioning system (GPS). Measures employing an inertial navigation system or various types of beacons may also be used. Alternatively, position measurement may be performed using a combination of these technologies.

The computer processing based on the detection signals from the tire turning sensors 30 that are vehicle travel distance detectors and the detection signals from the gyro 31 that is a vehicle bearing detector is as follows.

Computation of vehicle travel distance S:

The number of tire turns N is found on the basis of the detection signals from the tire turning sensors 30.

Next, the vehicle travel distance S is calculated from the product of that number of tire turns N and the known tire load radius r.

Computation of vehicle bearing $\theta$:

By integrating the angular velocity $\omega$ of the vehicle attitude angle based on the detection signals of the gyro 31, a vehicle bearing change $\Delta\theta$ is calculated, this bearing change $\Delta\theta$ is added to the known initial bearing, and the current vehicle bearing $\theta$ is calculated relative to the initial vehicle bearing.

Computation of vehicle position (X, Y):

The vehicle coordinate position (X, Y) on the X–Y coordinate system is found by integrating the products of the vehicle travel distance S, noted earlier, and, respectively, the sine sin and cosine cos of the vehicle bearing θ, i.e. S·sin θ and S·cos θ.

Figure 11:
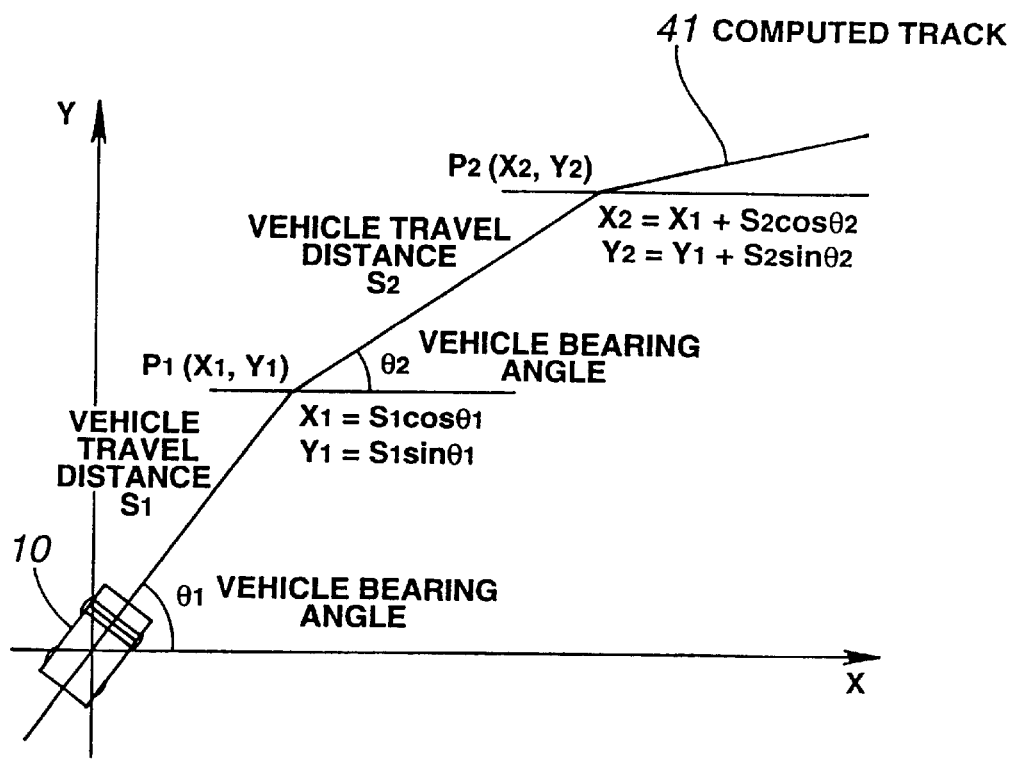
FIG. 11 is a diagram for use in describing dead-reckoning navigation.

More specifically, as diagrammed in FIG. 11, successive vehicle positions P1 (X1, Y1)=(S1·cos θ1, S1·sin θ1), P2 (X2, Y2)=(X1+S2·cos θ2, Y1+S2·sin θ2) . . . are calculated, and the computed track 41 of the vehicle 10 is found.

The vehicle controller 35 compares the track 41 (current position P) of the vehicle 10 thus computed against the planned travelling path 40 (target point P') that is the target path, and controls the vehicle 10 by so-called dead-reckoning navigation so that the vehicle 10 follows the planned travelling path 40. That is, requisite electrical signals are output to the steering-hydraulic-pressure proportional solenoid value, and the steering control angle is controlled, so that the successive vehicle positions P'1, P'2, P'3, . . . , on the planned travelling path 40 and the targeted vehicle bearings θ'1, θ'2, θ'3, . . . , are realized. Also, requisite electrical signals are output to the electronically controlled governor, transmission solenoid valve, and brake-pressure proportional solenoid value, and the engine R.P.M., transmission speed stage, and brake pressure are controlled so that the successive targeted vehicle positions on the planned travelling path 40 and targeted vehicle bearings are realized. Thus the vehicle 10 is guided along the planned travelling path 40. Similar operations are performed for the other vehicles 11, 12 . . . .

Figure 4:
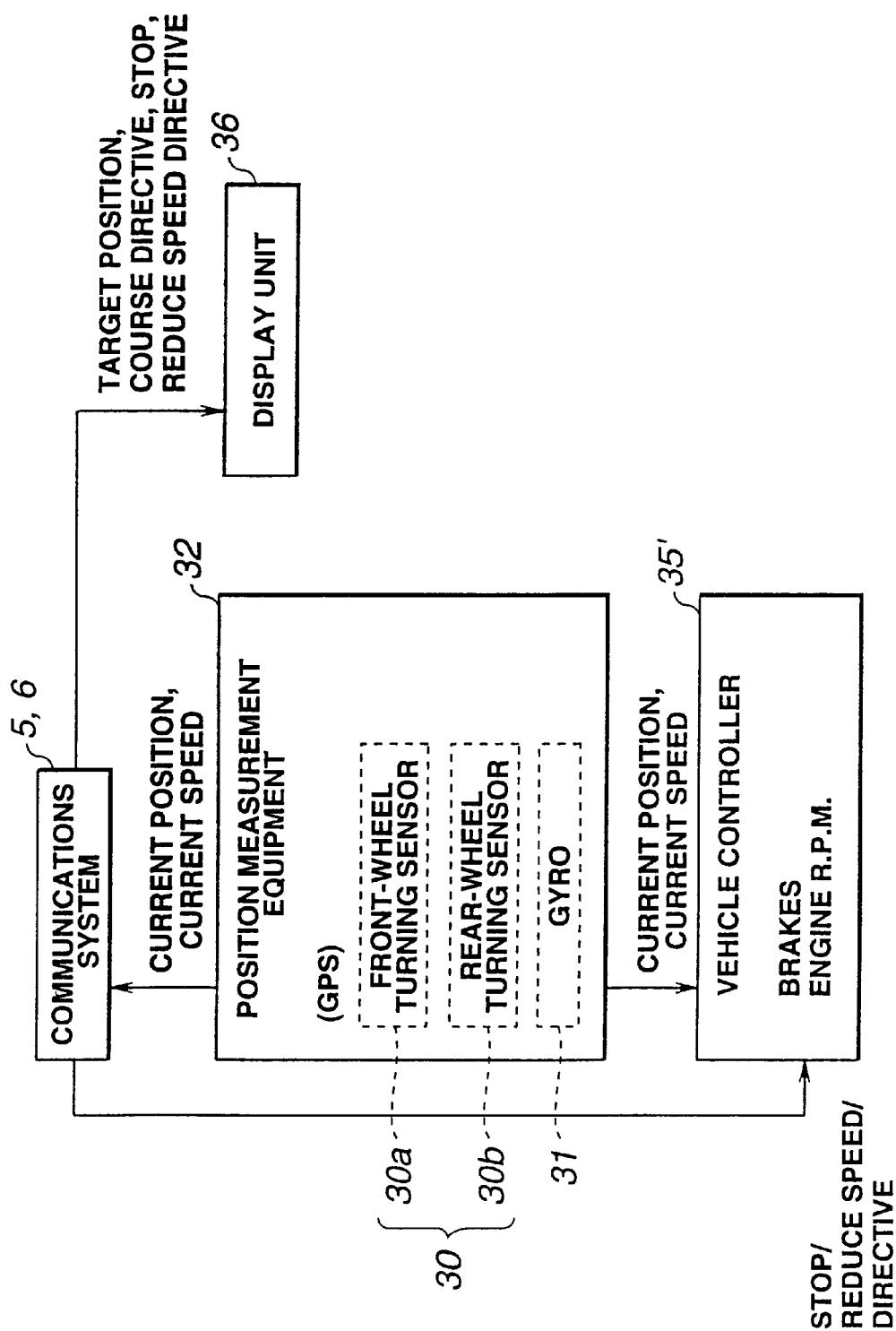
FIG. 4 is a block diagram representing the configuration of equipment carried in a manned vehicle in the embodying aspect.

When the monitoring system of this embodying aspect includes manned vehicles, the equipment carried by those manned vehicles is configuration as diagrammed in FIG. 4.

Basically, with a vehicle controller 35', the steering angle, braking, transmission, and engine R.P.M. are manually controlled by the manipulations of an operator, but in some cases the braking and engine R.P.M. are automatically controlled.

More specifically, each unmanned vehicle is provided with a display unit 36 for displaying the particulars of such directive data as the targeted position of the vehicle, directives for course to be negotiated (planned travelling path), stopping directives, and speed reduction directives, which are transmitted from the monitoring station 20. When things are normal, the operator will manipulate the various controls as necessary to follow the particulars displayed on the display unit 36, manually controlling the steering angle, braking, transmission, and engine R.P.M.

However, in cases where the particulars of the directive data have not been executed within a prescribed period of time after the display of those directive data on the display unit 36, braking and engine R.P.M. are automatically controlled, and the manned vehicle is automatically slowed down or stopped, etc., so that those directive data particulars are automatically executed.

Now, in this embodying aspect, the course that each of the plurality of vehicles 10 . . . is to travel over is fundamentally different, wherefore a plurality of travel routes 40-1, 40-2, 40-3 . . . is presumed for the planned travelling path 40. In some cases these travel routes 40-1, 40-2, 40-3 . . . will have points where they intersect with one another, and in some cases vehicles will pass each other in the opposite direction on the same travel route.

That being so, these planned travelling paths 40 are taught prior to actual operations.

Planned travelling path 40 teaching runs:

An operator drives one of the vehicles, say vehicle 10, making an actual run over all the planned travelling paths 40-1, 40-2, 40-3 . . . . By so doing, position data (X, Y) for target points P'0, P'1, P'2, P'3 . . . on the planned travelling paths, bearing data θ', and point passage velocity V' data, etc., (collectively referred to as course data) are acquired, and these course data are transmitted to the monitoring station 20 via the monitoring station-vehicle communication system 5 described earlier.

The monitoring station 20 which receives these course data sends course data for the planned travelling paths as required by each vehicle 10, 11, 12, 13 . . . to those vehicles by means of the monitoring station-vehicle communication system 23. If the planned travelling path for vehicle 10 is the travel route 40-1, for example, course data concerning this travel route 40-1 are transmitted to that vehicle 10. Alternatively, course data concerning all of the planned travelling paths may be transmitted to each vehicle.

Figure 7A:
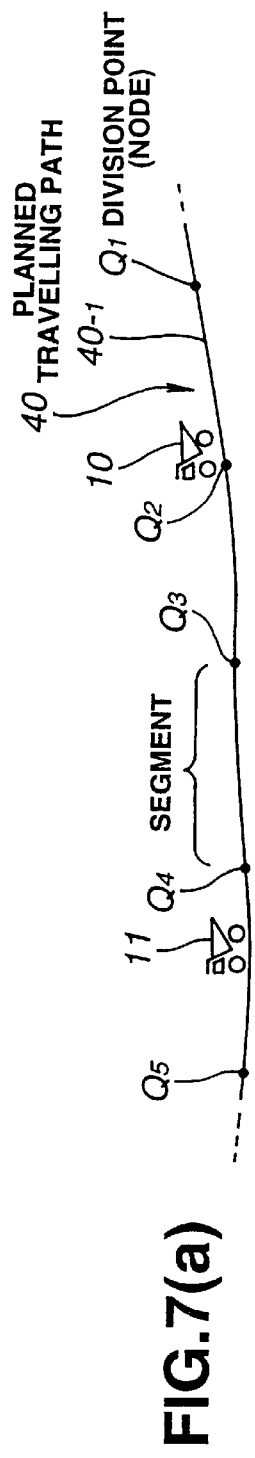
FIGS. 7(a), 7(b), and 7(c) are diagrams representing vehicle position relationships in the embodying aspect.

During the teaching described in the foregoing, division point data (X, Y) are acquired for division points (called nodes) Q1, Q2, Q3, etc., that divide the planned travelling paths 40 at various points, separately from the target points that are for dead reckoning (cf. FIG. 7(a)).

These division points Q1, Q2, Q3 . . . are the points where, each time a vehicle passes such a division point, current position data P (X, Y) for that own vehicle are transmitted to the monitoring station 20 via the monitoring station-vehicle communication system 5. The following measures may be considered in terms of criteria for determining these division points Q1, Q2, Q3 . . . .

(1) Intervals (times) are established that allow the monitoring station 20 to continually ascertain the positions of the vehicles without placing a load on the communication lines, in consideration of the number of vehicles and the communication system (VHF, for example) of the monitoring station-vehicle communication systems 23 and 5.

The following points may also be taken into consideration.

(2) The distances between adjacent division points (Qi to Qi+1, called a segment (cf. FIG. 7(a))) are established so that they are not shorter than the vehicle stopping distances, in consideration of the weights and speeds, etc., of the vehicles.

(3) The lengths of the segments Qi to Qi+1 are established so that they are not shorter than the effective detection distances of the obstacle sensors 34.

By effective detection distance of the obstacle sensor 34 is here meant the distance from a current position on the planned travelling path 40 to a position thereon corresponding to the maximum sensor detection range, which can be determined from the course data.

Also, as will be described subsequently, if two or more vehicles are present on mutually different segments, there is little danger of collision, etc. Therefore, when the effective detection distance of the obstacle sensor 34 is greater than the length of one segment, the obstacle sensor 34 will be activated even though there is little danger of collision, etc., which results in unnecessary speed reductions and stops, and hence is undesirable in the interest of safety.

That being so, the length of each segment Qi to Qi+1 is established so that it is not shorter than the effective detection distance of the obstacle sensor 34, as noted in (3) above.

The division point data collected in this manner are transmitted to the monitoring station 20 by the monitoring station-vehicle communication system 5 together with the course data noted above.

The monitoring station 20, having received the division point data, transmits division point data for the planned travelling paths as required by each vehicle 10, 11, 12, 13 . . . by means of the monitoring station-vehicle communication system 23. If the planned travelling path for the vehicle 10 is the travel route 40-1, for example, division point data for that travel route 40-1 are transmitted to that vehicle 10. It is also permissible to transmit all division point data for all of the travel routes to every vehicle.

Figure 5:
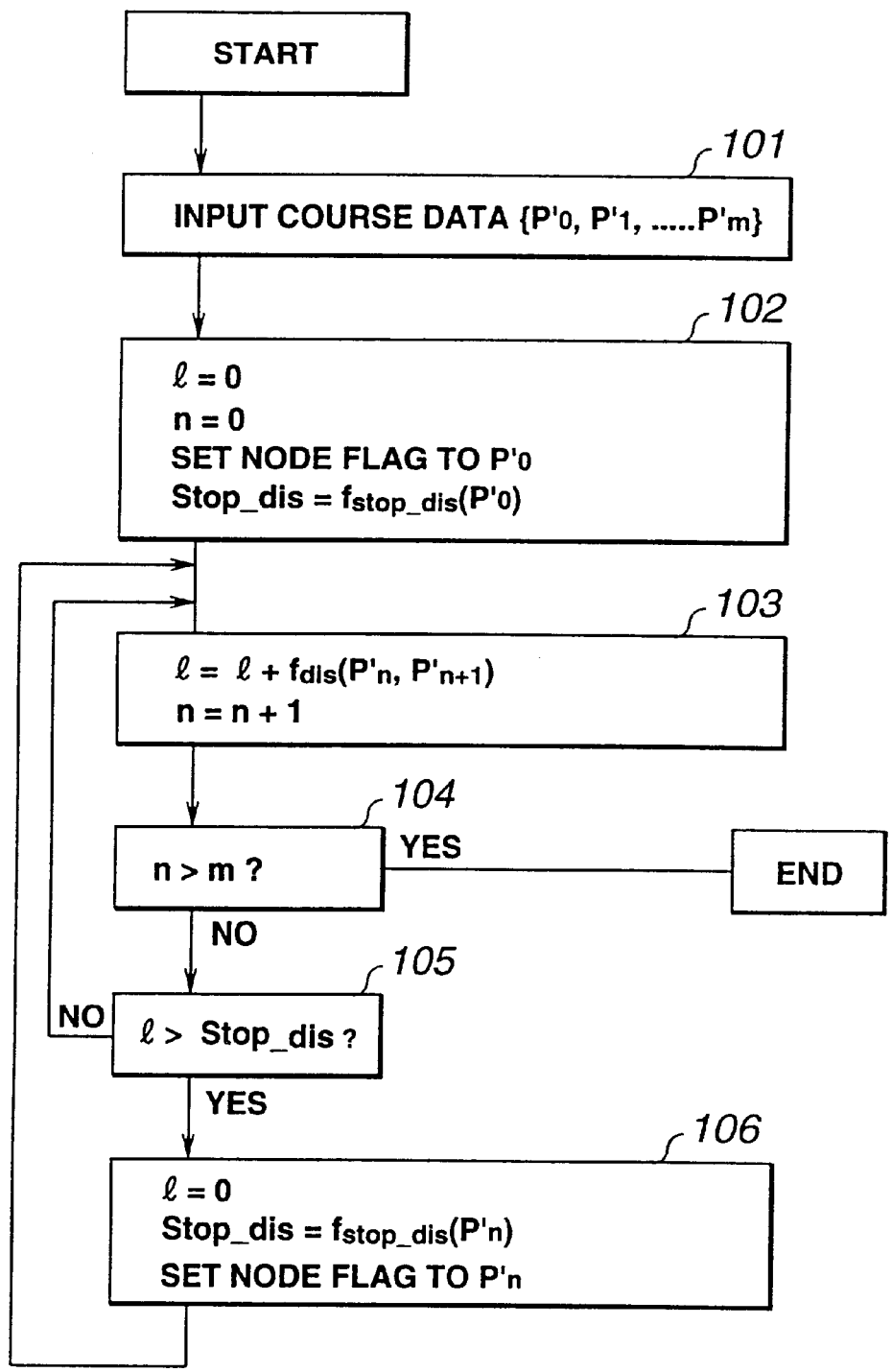
FIG. 5 is a flowchart of teaching processing procedures in the embodying aspect.

FIG. 5 is a flowchart exemplifying processing procedures for such teaching. In this flowchart, the planned travelling paths 40 are divided according to the criterion stated in (2) above. In normal cases, if the criterion stated in (2) above is satisfied, then the criterion stated in (1) above will also be satisfied.

In this flowchart, f dis is a function for finding the segment length, while f stop dis is a function for finding the stopping distance l from the vehicle loaded weight and the speed V' of the vehicle at the target point P', etc. The term "node flag" refers to a flag indicating a division point (boundary between two segments). And "Stop dis" is the vehicle stopping distance.

As indicated in FIG. 5, when the vehicle 10 actually travels over the planned travelling paths 40, and course data are acquired for the target points P0, P1, . . . , Pm (step 101), the l indicating the segment length is initialized to 0, the symbol n representing the sequence number 0, 1, 2 . . . for the target points P is initialized to 0, and the flag indicating the node is set for the first target point P'0. The content of Stop dis, the vehicle stopping distance, is set to the stopping distance f stop dis (P'0) at the first target point P'0. That is, because the vehicle weight and speed V', etc., at the target point P' are known from the course data, the stopping distance at the first target point P' can be found in consideration thereof. This stopping distance may also be found so that it reflects other parameters, such as weather and road surface conditions (step 102).

Next, the content of the segment length l is changed to a length found by adding the segment length f dis (P'n, P'n+1) that is the distance from the current target point P'n to the next target point P'n+1, to the current segment length l, and n is incremented by +1 (step 103).

Following this, a decision is made as to whether or not the current value of n is larger than a maximum value m (step 104). When the maximum value m is exceeded, the division of the planned travelling paths 40 is considered to be completed, and processing is terminated. If, however, the current value of n is the same as or lower than the maximum value m, it is assumed that the division of the planned travelling paths 40 is not yet completed, and the procedures move to the next step 105.

In step 105, a decision is made as to whether or not the current segment length l is larger than the current vehicle stopping distance Stop dis.

As a result, when the current segment length l is no greater than the current vehicle stop distance Stop dis, the procedures move to step 103 to make the segment length l longer so that it will coincide with the vehicle stopping distance Stop dis, and the same process is repeated.

When, in step 105, on the other hand, the current segment length l has become larger than the current vehicle stopping distance Stop dis, that is, when the segment length l has been successively increased until it coincides with the vehicle stopping distance Stop dis, it is determined that the distance between target points P'0 and P'n+1 (say P'3, for example) obtained in the current step 103 is the first segment length, and the procedures move to step 106 to find the length of the next segment.

Here, as in step 102 described earlier, the l representing the segment length is initialized to 0, and the flag indicating the node is set for the target point P'n (say P'3, for example), corresponding to the value of n obtained in the current step 103. Also, the vehicle stopping distance Stop dis is made the stopping distance f stop dis (P'n) at this target point P'n.

Thereupon, the procedures move to step 103, and execution of the same process is repeated, all of the division points (nodes) P'0, P'3 . . . , in the planned travelling paths 40 are found, and the length of each segment is found.

Thus the teaching operation is completed, and the teaching data (course data and division point data) are recorded in the course data memory unit 33 in each vehicle. As necessary, in cases where the weather changes and the vehicle stopping distance varies, the division processing for the planned travelling paths 40 flow-charted in FIG. 5 may be re-executed, and the new division point data obtained thereby transmitted to each vehicle to update the teaching division point data in the course data memory unit 30.

Start travel of each vehicle (playback operation)

When the teaching described in the foregoing has been completed, the monitoring station 20 transmits directive data indicating the final target point (destination) to each vehicle 10 . . . from the transmitter 21 in the monitoring station-vehicle communication system 23. If position measurements are being made by GPS, the monitoring station 20 transmits GPS differential data to the vehicles.

When these data are received by the receiver 2 of the monitoring station-vehicle communication system 5, the vehicle controller 35 guides its own vehicle along the planned travelling paths 40 by dead reckoning, as described earlier, and controls such operations as the loading, hauling, and discharge of cargo.

Control and monitoring by monitoring station:

During this time, the vehicles 10 . . . continually compare their current position measurement data (X, Y) against the taught division point data stored in the course data memory unit 33 and continually make decisions as to whether or not they have reached the division points Q1, Q2, Q3 . . . . Thereupon, when a vehicle reaches a division point, current position data (X, Y) are transmitted to the monitoring station 20 from the transmitter 1 of the monitoring station-vehicle communication system 5.

When the position data transmitted from the vehicles 10 are received by the receiver 22 in the monitoring station-vehicle communication system 23 at the monitoring station 20, a Judgment is made at the monitoring station 20 that the multiple vehicles 10 . . . have at least approached the (segment) distance between the division points Qi and Qi+1. In addition to current position data, the data transmitted to the monitoring station 20 may also include bearing data θ, speed data, position measurement reliability (error) data, and data indicating by how much a vehicle is off a planned travelling path 40, so as to further enhance the precision of the control and monitoring performed by the monitoring station 20.

Thus the monitoring station 20 can constantly ascertain mutual positional relationships between a plurality of vehicles, and thereby transmit appropriate travel and stopping directive data from the transmitter 21 of the monitoring station-vehicle communication system 23 to vehicles involved when there is a danger of an overtaking collision or intersection collision between vehicles.

Figure 6:
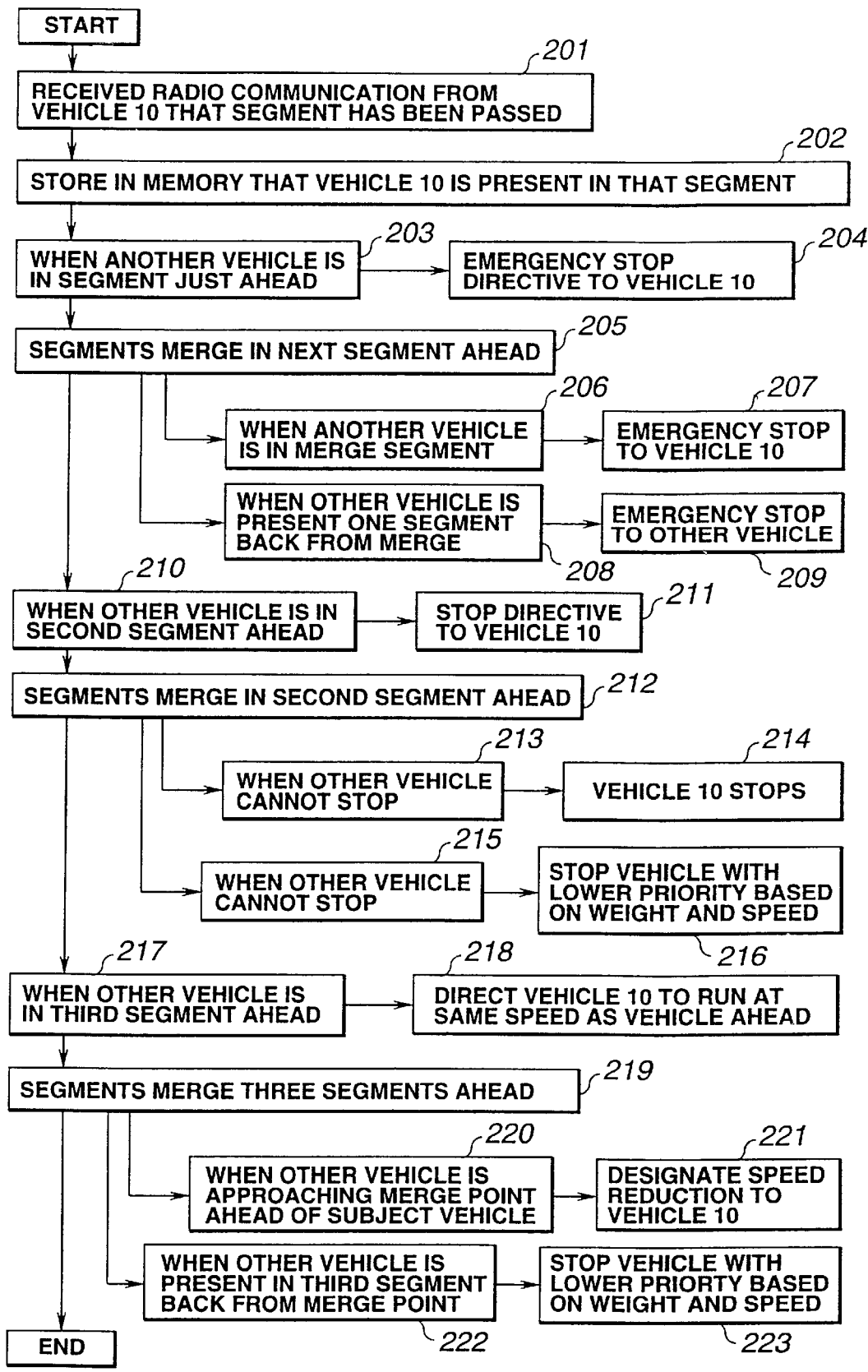
FIG. 6 is a flowchart of interference avoidance processing procedures in the embodying aspect.

FIG. 6 is a procedure flowchart for processing performed in the monitoring station 20 to avoid interference between vehicles. The content of this processing is now described with reference to FIGS. 7 to 10.

The vehicle 10 is here taken as representative of the vehicles 10, 11 . . . . The description assumes a case where position data are sent to the monitoring station 20 from this vehicle 10. Similar processing will be performed for the other vehicles 11, 12 . . . .

Figure 7B:
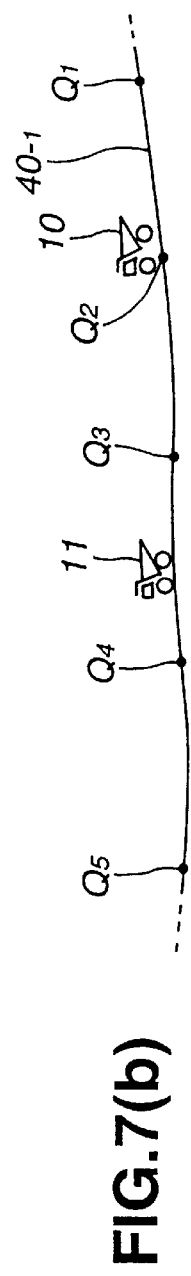
Figure 7C:
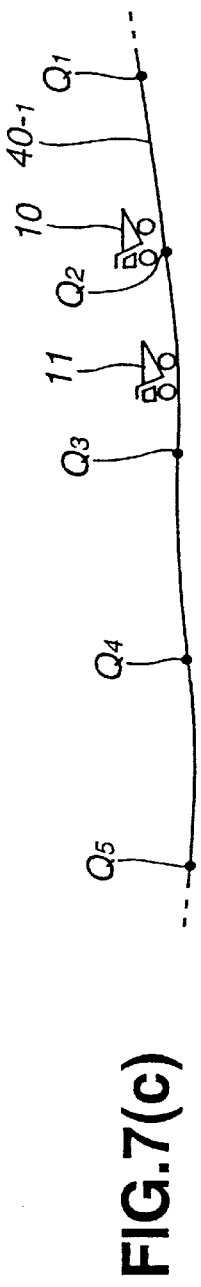

First, as diagrammed in FIGS. 7(a), 7(b), and 7(c), a case is considered wherein the vehicle 10 and another vehicle (vehicle 11 is indicated as representative) are advancing in the same direction over the same planned travelling path 40-1.

At the monitoring station 20, when a radio communication is received to the effect that the vehicle 10 has passed a division point (node), upon receipt of position data (and also speed data, etc.) from the vehicle 10 (step 201), the fact that this vehicle 10 is present in the segment Q2–Q3 that begins at the division point Q2 is stored in memory (step 202; cf. FIG. 6).

In this case, because data concerning which segment the other vehicle 11 is present in are also in memory, the monitoring station 20 can ascertain the positional relationship between the vehicle 10 and the other vehicle 11 in segment units.

Thereupon, if there is another vehicle 11 traveling ahead in the segment Q2–Q3 immediately ahead in the direction of advance of the vehicle 10, as diagrammed in FIG. 7(c) (step 203), the distance between the two vehicles is one involving a very high risk of collision, wherefore directive data will be transmitted to the vehicle 10 directing it to execute an emergency stop (i.e. a stop executed more quickly than a normal stop) (step 204).

If another vehicle 11 is present in the second segment Q3–Q4 ahead of the vehicle 10, as diagrammed in FIG. 7(b) (step 210), the distance between the two vehicles is one involving a risk of collision, wherefore directive data will be transmitted to the vehicle 10 directing it to execute a stop. The vehicle 10, upon receipt of these directive data, executes a stop (step 211).

If another vehicle 11 is present in the third segment Q4–Q5 ahead of the vehicle 10, as diagrammed in FIG. 7(a) (step 217), the distance between the two vehicles is one involving a low risk of collision, wherefore directive data will be transmitted to the vehicle 10 directing it to reduce speed (to the same speed as the vehicle 11 running ahead). The vehicle 10, upon receipt of these directive data, executes a speed reduction (step 211).

When the distance between two vehicles is greater than this, such as when the other vehicle 11 is traveling in segment Q5–Q6 when the first vehicle 10 passes the division point Q2, the inter-vehicular distance is considered great enough so that there is almost no danger of collision, and the vehicle 10 is allowed to continue traveling as is without being sent directive data to reduce speed or stop.

Next, as diagrammed in FIGS. 8(a) to 10(c), cases are considered where a planned travelling path 40-1 over which one vehicle 10 is traveling intersects with a planned travelling path 40-2 over which another vehicle 11 is traveling, with both vehicles 10 and 11 advancing in the same direction toward the intersection (merge point).

In such cases, the monitoring station 20 is aware of the positional relationship between the vehicle 10 and the other vehicle 11, in terms of segment units, wherefore the decision processes described below are performed.

Figure 10A:
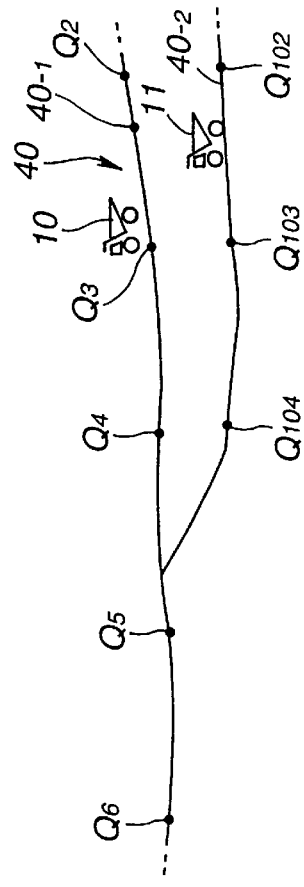
FIGS. 10(a), 10(b), and 10(c) are diagrams representing vehicle position relationships in the embodying aspect.
Figure 10B:
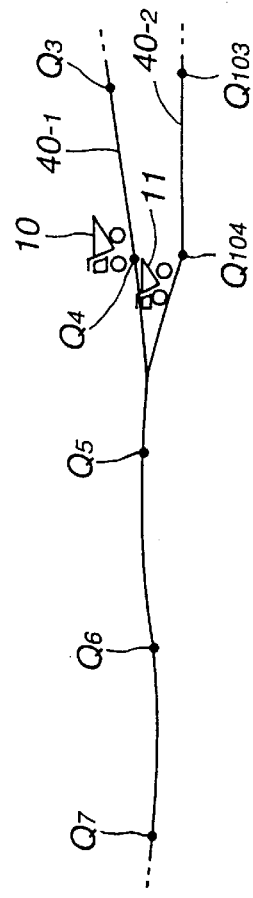
Figure 10C:
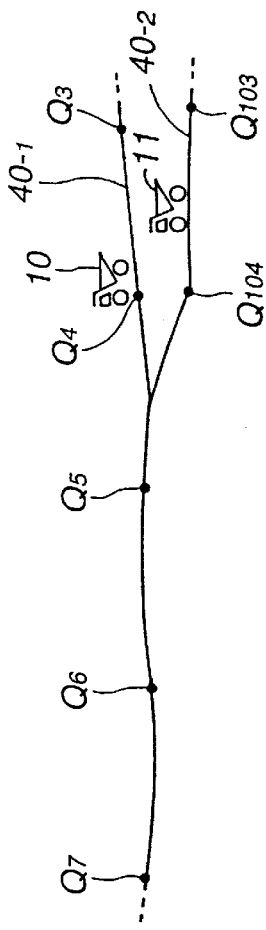

A case is considered first where, as diagrammed in FIGS. 10(b) and 10(c), the vehicle 10 has passed a division point Q4 at the beginning of a segment Q4–Q5 containing a merge point (step 205).

In this case, if another vehicle 11 is present in a segment Q104–Q5 that contains the same merge point, as diagrammed in FIG. 10(b) (step 206), the distance from the vehicle 10 to the merge point is very short, the risk of collision at that merge point is very high, and it is very difficult to avoid a collision by stopping the vehicle 11 that is closer to the merge point, wherefore directive data are transmitted to the vehicle 10 ordering it to execute an emergency stop (i.e. a stop executed more quickly than a normal stop). Upon receipt of these directive data, the vehicle 10 executes an emergency stop (step 207).

If, on the other hand, the other vehicle 11 is present in a segment Q103–Q104 located one segment earlier than the segment containing the merge point, as diagrammed in FIG. 10(c) (step 208), the distance from the vehicle 10 to the merge point is very short, the risk of collision at that merge point is very high, and it is possible to avoid collision by stopping the other vehicle 11 traveling behind, wherefore directive data are transmitted to that other vehicle 11 ordering it to execute an emergency stop (i.e. a stop executed more quickly than a normal stop). Upon receipt of these directive data, the vehicle 11 executes an emergency stop (step 209).

Figure 9A:
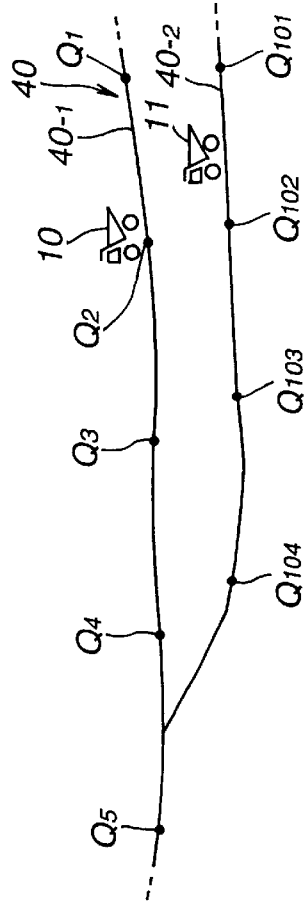
FIGS. 9(a), 9(b), and 9(c) are diagrams representing vehicle position relationships in the embodying aspect.
Figure 9B:
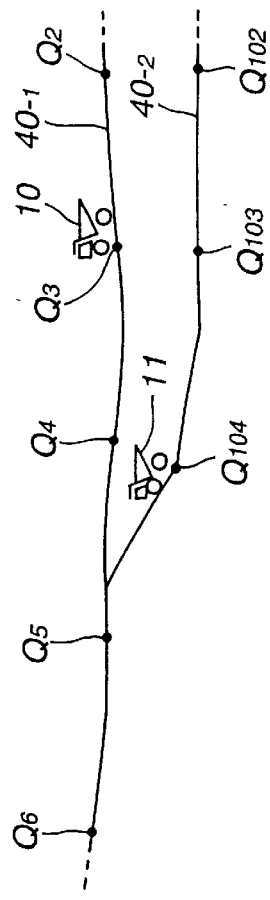
Figure 9C:
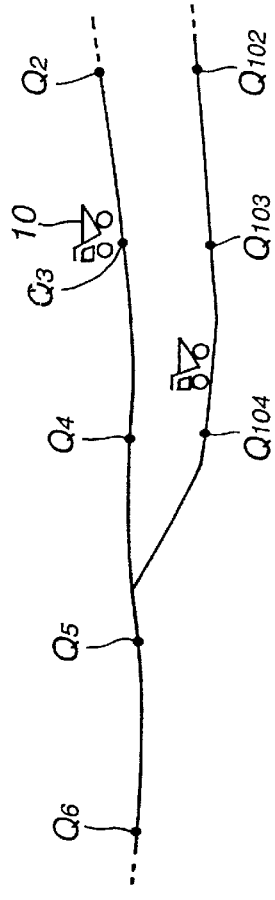

Next are considered cases where, as diagrammed in FIGS. 9(b), 9(c), and 10(a), the vehicle 10 has passed a division point Q3 at the beginning of a segment immediately in front of which is a segment Q4–Q5 containing a-merge point (step 212).

In such cases, if, as diagrammed in FIGS. 9(b) and 9(c), another vehicle 11 either is present in a segment Q104–Q5 containing the same merge point (FIG. 9(b)), or is present in a segment Q103–Q104 located one segment back from the segment containing that merge point (FIG. 9(c)), the distance from the vehicle 10 to the merge point is short, the risk of collision at that merge point is high, and it is very difficult to avoid collision by stopping the vehicle 11 that is ahead (step 213), wherefore directive data are transmitted to the vehicle 10 ordering it to stop. Upon receipt of these directive data, the vehicle 10 executes a stop (step 214).

If, on the other hand, the other vehicle 11 is present in a segment Q102–Q103 located two segments back from the segment containing the merge point, as diagrammed in FIG. 10(a), the distance from the vehicle 10 to the merge point is short, the risk of collision at that merge point is high, and it is possible to avoid collision by stopping the vehicle 10 that is ahead (step 215), wherefore directive data ordering a stop are transmitted to the vehicle given lower priority on the bases of the position data, but with data indicating speeds and weights sent from the vehicles 10 and 11 also factored in. The vehicle that receives these directive data executes a stop (step 216).

Next are considered cases where, as diagrammed in FIGS. 8(a), 8(b), 8(c), and 9(a), the vehicle 10 passes a division point Q2 at the beginning of a segment that is one segment removed from a segment Q4–Q5 containing a merge point (step 219).

Figure 8A:
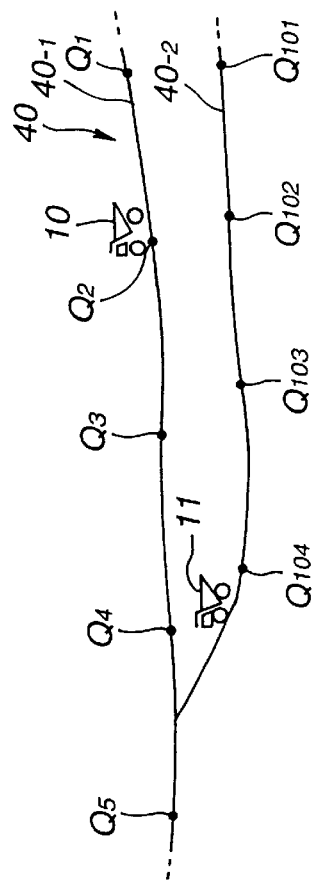
FIGS. 8(a), 8(b), and 8(c) are diagrams representing vehicle position relationships in the embodying aspect.
Figure 8B:
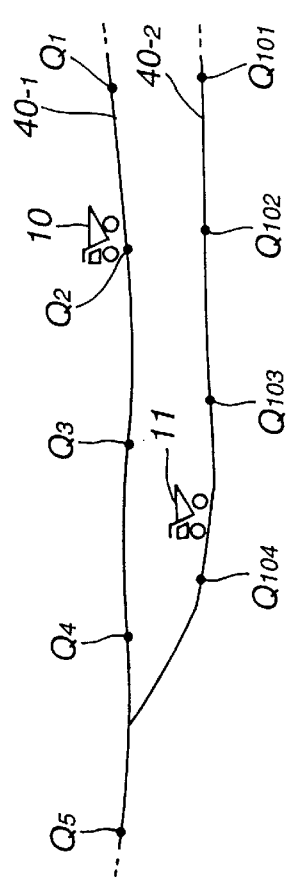
Figure 8C:
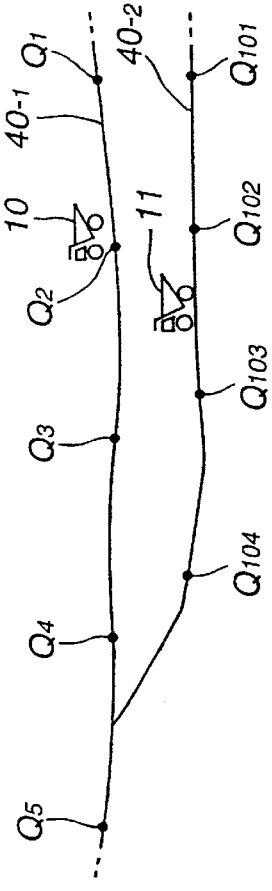

In these cases, if, as diagrammed in FIGS. 8(a), 8(b), and 8(c), another vehicle 11 either is present in a segment Q104–Q105 containing that merge point (FIG. 8(a)), or is present in a segment Q103–Q104 located immediately prior to the segment containing that merge point (FIG. 8(b)), or is present in a segment Q102–Q103 one segment removed from the segment containing that merge point (FIG. 8(c)), the distance from the vehicle 10 to the merge point is comparatively long, the risk of collision at the merge point is low, and it is difficult to avoid collision by stopping the vehicle 11 that is ahead because it is closer to the merge point (step 220), wherefore directive data are transmitted to the vehicle 10 ordering it to reduce speed (down to the same speed as that of the vehicle 11 which is ahead). Upon receipt of these directive data, the vehicle 10 executes a speed reduction (step 221).

If, on the other hand, the other vehicle 11 is present in a segment Q101–102 that comes before the segment containing the merge point, separated by two whole segments therefrom, as diagrammed in FIG. 9(a), the distance from the vehicle 10 to that merge point is comparatively long, the risk of collision at the merge point is low, and it is possible to avoid collision by stopping the vehicle 11 that is behind (step 222), wherefore directive data ordering a stop are transmitted to the vehicle given lower priority on the bases of the position data, but with data indicating speeds and weights sent from the vehicles 10 and 11 also factored in. The vehicle that receives these directive data executes a stop (step 223).

Thus the vehicles are made to reduce speed or stop, etc., in response to directive data from the monitoring station 20 ordering speed reductions or stops, whereupon collisions and other interference are avoided between vehicles.

When a vehicle involved here is a manned vehicle, the particulars of the directive data ordering stops or speed reductions transmitted by the monitoring station 20 are displayed on the display unit 36, the operator manipulates various controls as needed to execute those particulars displayed on the display unit 36, thereby manually controlling the steering angle, brakes, transmission, and engine R.P.M., and thus effecting a speed reduction or stop, etc.

Now, it may happen that the operator disregards the display and fails to execute the directive particulars. In view of this possibility, if such particulars contained in directive data (ordering a speed reduction or stop, etc.) are not executed within a prescribed length of time after the display of those directive data on the display unit 36, the brakes and engine R.P.M. will be automatically controlled so as to automatically execute the particulars of those directive data, and the manned vehicle will be made to automatically execute a speed reduction or stop, etc.

When a vehicle has stopped according to a directive from the monitoring station 20, as soon as other vehicles are no longer present in a segment ahead of that vehicle, that vehicle receives directive data from the monitoring station 20 ordering a resumption of travel, whereupon that vehicle starts traveling again. In a case where the vehicle 10 has stopped in the segment Q2–Q3, as diagrammed in FIG. 7(b), it will be directed to start off again as soon as the other vehicle 11 ceases to be present in the segment Q3–Q4 ahead (i.e. as soon as the vehicle 11 passes the division point Q4).

In this embodying aspect, furthermore, position data, etc., are transmitted to the monitoring station 20 from the vehicles each time they pass a division point Q on a planned travelling path 40, so that the monitoring station 20 can ascertain the positional relationships between the plurality of vehicles. However, an embodiment is also possible wherein this is eliminated, the function of the monitoring station 20 is made merely that of directing the vehicles to respective destinations (i.e. issuing travel directives), and the task of ascertaining the positional relationships between the vehicles is entrusted to intercommunication between the vehicles. In other words, an embodiment is possible wherein the ascertaining of the positional relationships among the plurality of vehicles that would be performed by the monitoring station 20 operating as a ground station is performed instead by mobile stations installed in the vehicles.

An embodying aspect is now described which can cope with various forms of interference over the entire area of the planned travelling paths 40. In the embodying aspects described from this point on, unless otherwise noted, it is assumed that the equipment is configured as in the embodying aspect described in the foregoing and diagrammed in FIGS. 1–11, wherefore the embodiment and modification examples set forth in the preceding descriptions can be applied.

Figure 12:
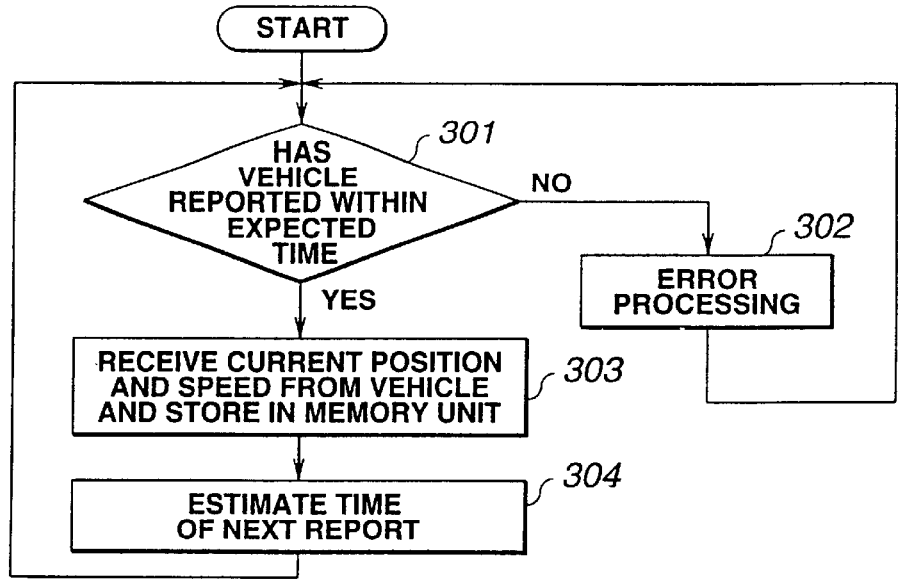
FIG. 12 is a flowchart of processing procedures performed by a monitoring station in an embodying aspect which differs from that diagrammed in FIGS. 1–11.
Figure 13:
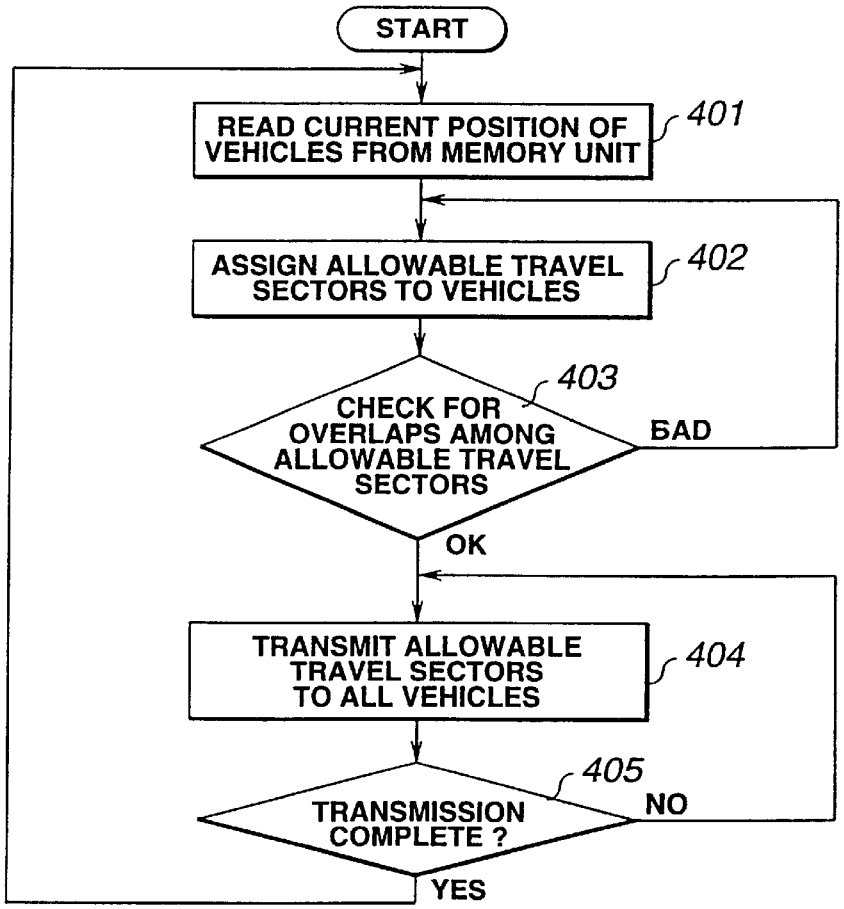
FIG. 13 is a flowchart of processing procedures performed by a monitoring station in an embodying aspect which differs from that diagrammed in FIGS. 1–11.

The processing procedures performed here by the monitoring station 20 are diagrammed in FIGS. 12 and 13.

In this embodying aspect, as in the embodying aspect described with FIGS. 1–11, the planned travelling paths 40 are sectioned off by division points Q1, Q2, Q3 . . . , and thus divided into segments, whereupon own vehicle position data as measured by each vehicle are transmitted to the monitoring station 20, via the monitoring station-vehicle communication systems 23 and 5, every time one of the division points Q1, Q2, Q3, etc., is passed.

That is, as indicated in FIG. 12, decisions are made in the monitoring station 20 as to whether or not own position data for a vehicle, say vehicle 10, for example, have been received from that vehicle 10 at the monitoring station 20 within a period of time that is conjectured according to the interval between the division points (step 301).

As a result, if those position data for the vehicle 10 are not received within that conjectured time, it is assumed that the vehicle 10 has sustained a malfunction or other problem, and prescribed error processing is performed (step 302).

If, on the other hand, the position data for the vehicle 10 have been received within the conjectured time, those received position data are stored as current position data in a prescribed memory unit, and, by finding the difference between these current position data and the position data received the previous time (before the sampling interval), etc., the current traveling speed and direction over the planned travelling paths 40 of the vehicle 10 are computed. Data representing these traveling speeds and travel directions are also stored in the same memory unit. Alternatively, instead of finding the traveling speed and direction by computation from the position data, the traveling speed and direction may be detected directly by deploying speed sensors, etc., in the vehicle 10 (step 303).

Next, the monitoring station 20 estimates the time that the next position data will be transmitted from the vehicle 10 and sets this time (step 304).

Thus, in this embodying aspect, position data are transmitted by each of the vehicles every time it passes a division point Q1, Q2, Q3 . . . , but it is possible to establish the transmission points in any manner wished, and position data may be transmitted every time two division points are passed, or every time three or more division points are passed. The intervals between division points may be established as either equal intervals or unequal intervals.

In this embodying aspect, furthermore, position data are transmitted every time a division point on the planned travelling paths 40 is passed, but the transmission points need not necessarily be limited to division points. In other words, it is sufficient to establish discretionary transmission points on the planned travelling paths 40 where position data are to be transmitted, to provide the vehicles beforehand with information indicating where those transmission points are located, and to have the vehicles transmit position data every time such a transmission point is passed. As an example, information that indicates the transmission points as coordinate positions (X, Y) could be provided to the vehicles.

In this embodying aspect, moreover, the transmission points are established beforehand, but it is also possible to effect embodiment such that transmission times are established beforehand. For example, a transmission interval may be established beforehand at which position data are to be transmitted from the vehicles to the monitoring station 20, so that the position data are transmitted to the monitoring station 20 from the vehicles at each of those transmission intervals. Alternatively, information may be sent beforehand to the vehicles to inform them of times when position data are to be transmitted, so that position data are transmitted to the monitoring station 20 from the vehicles as those transmission times occur.

In this embodying aspect, furthermore, it is assumed that the vehicles have information on transmission points or transmission intervals or transmission times, but embodiment is also possible such that transmission points, transmission intervals, or transmission times are transmitted to the vehicles from the monitoring station 20 at irregular times, so that such information is provided to the vehicles at irregular times. When the extent to which the vehicles are separated over the wide-area work site 30 (i.e. the degree of congestion) is fluid, and the degree of congestion is large, the likelihood of interference will be high, whereupon the vehicles can be directed to transmit position data at shorter intervals, whereas, when the degree of congestion is low, the likelihood of interference will be low, whereupon the vehicles can be directed to transmit position data at comparatively long intervals in order to avoid unnecessary communications. In cases where data concerning transmission points, transmission intervals, or transmission times are provided to the vehicles at irregular times from the monitoring station 20, information appropriate to a wide-area work site 30 wherein the degree of congestion varies fluidly can be optimally provided.

The content of the position data transmitted from the vehicles to the monitoring station 20 may be two-dimensional coordinates (X, Y), or symbols (like S2, for example) specifying certain segments. Alternatively, the symbols may specify points on the planned travelling paths 40 established independently of the segments.

FIG. 13 flow-charts processing procedures for producing directive data for directing the travel of the vehicles, and transmitting those data to a vehicle, such as vehicle 10, for example.

As indicated in FIG. 13, in the monitoring station 20, the current positions of all of the vehicles 10, 11, 13, 14 . . . that are present in the wide-area work site 30 are read out from the memory unit noted earlier, and allowable travel sectors are established on the planned travelling paths 40 for each vehicle so that it does not interfere with other vehicles. The particulars of how these allowable travel sectors are established will be described subsequently (step 402). Here, because the probability of interference occurring is high when the allowable travel sectors overlap between different vehicles, the allowable travel sectors should be reestablished, wherefore the procedures move again to step 402.

When there is no overlap between allowable travel sectors, directive data directing the vehicles to travel over their respective allowable travel sectors are transmitted to the vehicles via the monitoring station-vehicle communication systems 23 and 5 (step 404). At the point in time where it has been confirmed that such directive data have been transmitted (YES in step 405), the procedures again move to step 401, and execution of the same processing is repeated.

Next, the particulars concerning the establishment of the "allowable travel sectors" mentioned in the foregoing are described for specific situations.

Figure 14:
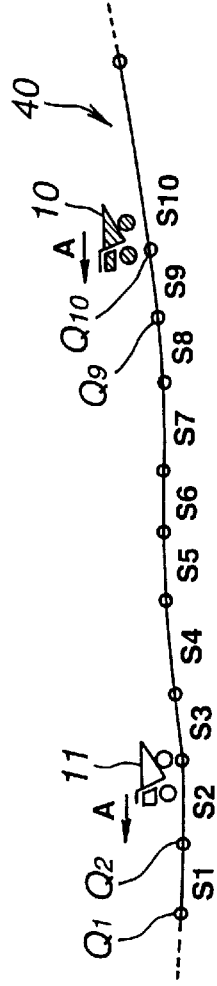
FIG. 14 is a diagram representing vehicle position relationships for describing the content of processing for establishing allowable travel sectors in FIG. 13.

FIG. 14 diagrams a case where two vehicles 10 and 11 are proceeding in the same direction A over the same travel route on a planned travelling path 40. This is an example case where the planned travelling path 40 is limited to one-way traffic. The description which follows focuses on the vehicle 10 in a case where directive data are transmitted to that vehicle 10.

In the embodying aspects that follow, moreover, the segments on the planned travelling paths 40 are specified S1 (Q1–Q2), S2 (Q2–Q3) . . . , S9 (Q9–Q10); S10 (Q10–Q11).

Here, if the speed of the vehicle 11 traveling ahead is higher than the speed of the vehicle 10 traveling behind, there is no danger of interference between these two vehicles, but there will be cases where, due to differences in vehicle weight as a result of the quantity of earth carried, etc., the speed of the vehicle 11 ahead will be lower, whereupon there will be a danger of interference (rear-end collision) occurring.

Now, the monitoring station 20 is cognizant of the current positions S10 and S2 of the vehicles 10 and 11, the current speeds V10 and V11 of the vehicles 10 and 11, and the direction of advance A of the vehicles 10 and 11. Therefore, from these data, the monitoring station 20 can establish allowable travel sectors wherein the vehicles 10 and 11 can travel safely without interference, namely the segments S10, S9, S8, S7, S6, S5, and S4 (step 402). These allowable travel sectors S10, S9, S8, S7, S6, S5, and S4 are established so that vehicle 10 will not interfere with vehicle 11, in view of communication lag, and of the fact that the positions of the vehicles 10 and 11 known by the monitoring station 20 already represent past conditions.

Thereupon, the monitoring station 20 transmits directive data to the vehicle 10 directing it to "travel over the allowable travel sector S10, S9, S8, S7, S6, S5, and S4" (step 404). In the vehicle 10 that has received these directive data, the vehicle controller 35 is drive-controlled so that the allowable travel sectors are traveled over according to the particulars in the directive data. As a result, the vehicle 10 in the rear will only travel as far as segment S4 so that it will not overtake the vehicle 11 in front, wherefore interference (rear-end collision) between the two vehicles 10 and 11 can be avoided.

The interval at which the allowable travel sector particulars are updated can be established at any interval wherewith the vehicle 10 will not have to stop.

When updated allowable travel sector data are transmitted from the monitoring station 20 before the vehicle 10 has completely traveled over the allowable travel sector noted above, the vehicle 10 will maintain its travel conditions just as they are so that it will continue to travel over the post-update allowable travel sector without stopping at the end point of the pre-update allowable travel sector. Thus the vehicle 10 is able to continue traveling, without danger of interference, and without stopping, based on continually updated allowable travel sector data.

If it should happen, however, that no updated allowable travel sector data are transmitted from the monitoring station 20 while the vehicle 10 is traveling in the allowable travel sector, the vehicle 10 will stop at the end point of the allowable travel sector and wait until data are transmitted indicating the next allowable travel sector.

The length of an allowable travel sector will be longer the greater is the distance from the vehicle 10 to the vehicle 11 in the lead, but becomes shorter the greater is the number of vehicles traveling ahead on the planned travelling path 40. In other words, the length of the allowable travel sector varies depending on the degree of congestion of vehicles on the planned travelling path 40.

For this reason, if the degree of congestion is low, then directives can be given to the vehicle 10 in a single communication directing it to travel. over an allowable travel sector covering an extremely long distance, making it possible to lower the frequentness of communications, so that the loads placed on the monitoring station 20 and the communication lines can be reduced.

In this embodying aspect, furthermore, an allowable travel sector is represented as all the segments in a continuous sequence of segments, such as "S10, S9, S8, S7, S6, S5, S4." However, it is permissible to represent only a first segment and a last segment, as S0 (beginning of allowable travel sector) and S4 (end of allowable travel sector), so that the data size can be compressed.

It is also permissible to make the allowable travel sector shorter, such as "S10, S9, S8, S7, S6," taking into consideration the distance within which the vehicle 10 can stop and the effective detection range of the obstacle sensor installed in the vehicle 10. When the stopping distance for the vehicle 10 in the allowable travel sector has been estimated beforehand, it is possible to have the vehicle 10 begin reducing speed and stop after reaching the end point of the allowable travel sector (i.e. at the division point Q6 at the end of segment S6).

Figure 15:
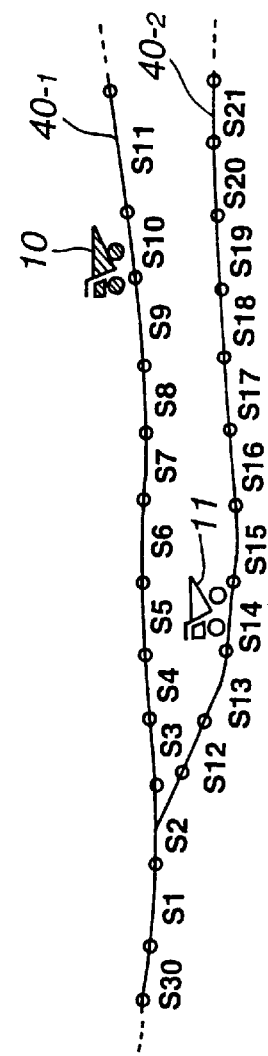
FIG. 15 is a diagram representing vehicle position relationships under conditions differing from those in FIG. 14.

Next, a case is considered wherein, as diagrammed in FIG. 15, a planned travelling path 40-1 over which one vehicle 10 is traveling intersects with a planned travelling path 40-2 over which another vehicle 11 is traveling, and both vehicles 10 and 11 are advancing in the same direction toward that intersection (merge point).

The sector containing the intersection, that is, the segment containing the intersection, is S2. The plurality of vehicles 10 and 11 cannot enter this segment S2 at the same time. That being so, under these conditions, it becomes necessary to decide which of the two vehicles 10 and 11 should first enter the segment S2 containing the intersection.

Now, the monitoring station 20 is cognizant of the current positions S10 and S14 of the vehicles 10 and 11, the current speeds V10 and V14 of the vehicles 10 and 11, and the direction of advance A of the vehicles 10 and 11 (i.e. a direction of advance toward the intersection), wherefore, from these data, a decision is made to have the vehicle 11 traveling ahead to first enter the segment S2 containing the intersection, and a safe allowable travel sector is established for the vehicle 10 running behind wherein it will not interfere with the vehicle 11, namely the sector comprising segments S10, S9, S8, S7, S6, S5, S4, and S3 (not containing the intersection segment S2). Meanwhile, for the vehicle 11 that is ahead, a safe allowable travel sector wherein it will not interfere with the vehicle 10 is established, namely the sector comprising segments S14, S13, S12, S2, and S1 (containing the intersection sector S2) (step 402). Directive data directing travel over these allowable travel sectors are transmitted to the vehicles 10 and 11, respectively (step 404). The vehicle controller 35 in each of the vehicles 10 and 11 which have received these directive data are drive-controlled so that the vehicles travel over the allowable travel sectors noted above, according to the particulars of the directive data. As a result, while the vehicle 11 that is running ahead enters the segment S2 containing the intersection, the vehicle 10 running behind will only travel as far as the segment S3 encountered before the segment S2 containing the intersection, wherefore interference between the two vehicles 10 and 11 (i.e. a collision at the intersection) can be avoided.

The interval at which the particulars concerning the allowable travel sectors are updated is established at any desired interval, as in the case diagrammed in FIG. 14, wherewith the vehicles 10 and 11 can continue traveling without stopping.

After the vehicle 11 enters the segment S2 containing the intersection, the travel situation becomes one wherein two vehicles 10 and 11 are traveling in the same direction over the same planned travelling path, as in the case diagrammed in FIG. 14, whereupon the allowable travel sectors can be established in the same manner as in the case diagrammed in FIG. 14.

If the vehicle 11 stops because of a malfunction, etc., after canceling the allowable travel sector comprising the segments S14, S13, S12, S2, and S1 for the vehicle 11, directive data may be sent to the vehicle 10 to travel over an allowable travel sector comprising segments S10, S9, S8, S7, S6, S5, S4, S3, S2, and S1 (containing the intersection segment S2) so that it can advance first into the intersection.

The length of the allowable travel sectors can also be varied according to the degree of congestion between the vehicles on the planned travelling paths 40.

In this case also, if the degree of congestion is low, then directives can be given to the vehicles in a single communication directing them to travel over allowable travel sector covering extremely long distances, making it possible to lower the frequentness of communications, so that the loads placed on the monitoring station 20 and on the communication lines can be reduced.

Furthermore, as in the case diagrammed in FIG. 14, it is permissible to represent only a first segment and a last segment, such as S10 (beginning of allowable travel sector) and S3 (end of allowable travel sector), so that the data size can be compressed.

It is also permissible to make the allowable travel sector shorter, such as "S10, S9, S8, S7, S6, S5," which is shorter than "S10, S9, S8, S7, S6, S5, S4, S3," for example, taking into consideration the distance within which the vehicles can stop and the effective detection range of the obstacle sensors installed in the vehicles. When the stopping distances for the vehicles in the allowable travel sectors have been estimated beforehand, it is possible to have the vehicles begin reducing speed and stop after reaching the end point of the allowable travel sector (i.e. at the division point Q5 at the end of segment S5).

Now, in the embodying aspect diagrammed in FIGS. 14 and 15, described in the foregoing, the intervals at which the position data are transmitted from the vehicles to the monitoring station 20 may be made different between the first half and the latter half of the allowable travel sector.

For example, in the case diagrammed in FIG. 15, the allowable travel sector comprising the segments S10, S9, S8, S7, S6, S5, S4, and S3 is established for the vehicle 10, but it is possible to have position data transmitted every time five segments have been passed through (when passing S10 and S6) in the first half of the allowable travel sector comprising the segments S10, S9, S8, S7, and S6, which is distant from the intersection, but to have position data transmitted every time a segment is passed (when passing S5, S4, and S3) in the latter half of the allowable travel sector comprising the segments S5, S4, and S3, which is close to the intersection.

Thus, by increasing the frequentness of communications the closer is approached a place where there is danger of interference, the monopolization of radio resources associated with position reporting can be minimized and high-precision monitoring made possible.

In the embodying aspect diagrammed in FIGS. 14 and 15, it is assumed that directive data directing travel over allowable travel sectors are transmitted unidirectionally from the monitoring station 20 to the vehicles via the monitoring station-vehicle communication systems 23 and 5. However, embodiment is also possible wherein, while allowable travel sectors are assigned to the vehicles in communication from the monitoring station 20, own position data are exchanged mutually by the vehicles themselves, via the inter-vehicle communication system 6, in travel sectors where there is a danger of interference between those vehicles, so that permissions to travel are generated reciprocally among those vehicles. By embodying in this manner, the consumption of the limited radio resources available to the monitoring station-vehicle communication systems 23 and 5 can be held to a minimum.

In the case diagrammed in FIG. 15, for example, the monitoring station 20 transmits, to the vehicles 10 and 11 requiring reciprocal communications because of the danger of interference (collision at the intersection), data specifying the other vehicle with which there is a danger of interference with the own vehicle (i.e. vehicle 11 if the own vehicle is vehicle 10), via the monitoring station-vehicle communication systems 23 and 5. Also, the allowable travel sector "S10, S9, S8, S7, S6, S5" is assigned to vehicle 10. However, permission to travel further, from that point to the intersection, i.e. through the sector "S4, S3, S2," is given with the condition that reciprocal communications be conducted with vehicle 11. Similarly, the allowable travel sector "S14, S13" is assigned to vehicle 11. But permission to travel further, from that point to the intersection, i.e. through the sector "S12, S2," is given with the condition that reciprocal communications be conducted with vehicle 10.

Vehicles that have received data from the monitoring station 20 specifying other vehicles can ascertain who should be communicated with from the data specifying the other vehicles, wherefore own vehicle position data are exchanged with such other vehicles (with vehicle 11 if vehicle 10 is the own vehicle) via the inter-vehicle communication system 6. As a result, in the case, for example, where the vehicle 10 is approaching the intersection faster, vehicle 10 is given permission, through communications with vehicle 11, to travel first through the sector "S4, S3, S2" to the intersection. As a result of this, the vehicle 10 will enter the segment S2 containing the intersection ahead of vehicle 11. Once vehicle 10 has passed through segment S2, vehicle 11 is given permission to travel through the sector "S12, S2."

This procedure wherein, when two vehicles are present in sectors involving a danger of interference, permission to travel is given after confirming the position of the vehicle being communicated with by reciprocal communications between the two vehicles, can be applied in cases where, as diagrammed in FIG. 14, vehicles are traveling in the same direction over the same travel route.

Furthermore, in cases where it is known that a vehicle 11 running ahead will enter first into a specified sector S2 (containing an intersection, for example), in the planned travelling paths 40, wherein entry is allowed to only one vehicle at a time, and that a vehicle 10 running behind will enter that sector S2 later, permission to travel can be granted as described below.

In this case, data specifying the vehicle 11 running ahead are transmitted to the vehicle 10 running behind via the monitoring station-vehicle communication systems 23 and 5, and directive data directing travel through the allowable travel sector "S10, S9, S8, S7, S6, S5" are also transmitted to vehicle 10. However, permission to travel through the subsequent sector "S4, S3" is given with the condition that reciprocal communications be conducted with vehicle 11 and confirmation be made that vehicle 11 has exited the specified sector. That is, in order for vehicle 10 to enter the segment S4, it must confirm that vehicle 11 has left the segment S2. And in order for vehicle 10 to enter the segment S3, it must confirm that vehicle 11 has left the segment S1.

Thereupon, vehicle 10, which has received data from the monitoring station 20 specifying another vehicle 11, can determine from the data specifying the other vehicle 11 who to communicate with (i.e. vehicle 11), and therefore will communicate with that other vehicle 11 via the inter-vehicle communication system 6 and receive position data from that vehicle 11. As a result, once it has confirmed that vehicle 11 has left the segment S2 containing the intersection, vehicle 10 will enter the segment S4 and travel over this sector S4. Furthermore, after confirming that vehicle 11 has left the last segment S1 in the allowable travel sector assigned to that vehicle 11, vehicle 10 will enter the segment S3 and travel over this sector S3. Subsequently, the particulars of the allowable travel sector for vehicle 10 will be updated, and vehicle 10 will in due course enter the specified sector (segment S2 containing the intersection) later than vehicle 11, wherefore collision with vehicle 11 at the intersection can be avoided.

In this embodying aspect, moreover, permission to travel through the sector "S4, S3" is given with the condition that reciprocal communications be conducted with the vehicle 11 and confirmation be made that vehicle 11 has exited the specified sector. However, it is also permissible to grant permission to travel through the sector "S4, S3, S2" that contains the intersection with the condition that reciprocal communications be conducted with the vehicle 11 and that confirmation be made that vehicle 11 has exited that specified sector. In this latter case, for example, vehicle 10 may be allowed to enter the segment S2 containing the intersection after confirming that vehicle 11 has already exited the segment S30.

Thus it is possible, by employing reciprocal communications via the inter-vehicle communication system 6, to grant permission to the vehicle 10, with a single communication between the monitoring station and the vehicles, to travel through a travel sector "S10, S9, S8, S7, S6, S5, S4, S3, S2" that is substantially longer than the allowable travel sector "S10, S9, S8, S7, S6, S5" (allowable travel sector assigned after estimating the stopping distance of vehicle 10) as when using only the monitoring station-vehicle communication systems 23 and 5. Thus the frequentness of communication can be reduced, and monopolization of radio resources held to a minimum.

Also, because the vehicle 10 can travel over a longer distance with a single communication, the vehicle 10 has greater capability of continuous travel without making stops, even in cases where allowable travel sector updating processing is delayed at the monitoring station 20, whereupon work efficiency can be improved.

This procedure, wherein, when it is predicted that a vehicle traveling ahead will enter a specified sector which cannot be entered simultaneously by more than one vehicle, a vehicle traveling behind is allowed to enter that specified sector later, after confirming by reciprocal communications between the two vehicles that the vehicle traveling ahead has exited the specified sector, can be applied in cases where, as diagrammed in FIG. 14, the vehicles are traveling in the same direction over the same travel route. In this latter case, the vehicle 10 traveling behind cannot be simultaneously present in the segment where the vehicle 11 traveling ahead is present, wherefore the vehicle 10 will operate with an awareness of which segment the vehicle 11 is currently present in, so that it does not enter that segment, but, upon confirmation that the vehicle 11 has passed through a segment, can enter the segment coming before, or the segment one segment removed from, that segment which the vehicle 11 has passed through.

Describing this with reference to FIG. 14, data specifying the lead vehicle 11 are transmitted to the following vehicle 10, from the monitoring station 20, via the monitoring station-vehicle communication systems 23 and 5, and, at the same time, directive data directing travel through the allowable travel sector "S10, S9, S8, S7, S6, S5, S4" are transmitted to that vehicle 10. However, permission to travel through the sector S3 coming one segment earlier than the specified sector S2 occupied currently by the lead vehicle 11 is granted with the condition that reciprocal communications be conducted with the vehicle 11 and that confirmation be made that the vehicle 11 has exited from that specified sector S2. Similarly, permission to travel through the specified sector S3 occupied currently by the lead vehicle 11 is granted with the condition that reciprocal communications be conducted with the vehicle 11 and that confirmation be made that the vehicle 11 has exited the sector S1 that is one segment beyond that specified sector S2. In other words, in order for the vehicle 10 to enter the segment S3, it must confirm that the vehicle 11 has left the segment S2. And in order for the vehicle 10 to enter the segment S2, it must confirm that the vehicle 11 has left the segment S1.

Thereupon, the vehicle 10 that has received data specifying the other vehicle 11 can, from the data specifying the other vehicle 11, ascertain who should be communicated with (i.e. vehicle 11), and thus will receive position data for that other vehicle 11 via the inter-vehicle communication system 6. As a result, upon confirming that the vehicle 11 has left the segment S2, the vehicle 10 will enter the segment S3 and travel through this sector S3. Then, upon confirmation that the vehicle 11 has left the segment S1, the vehicle 10 will enter the segment 2 and travel through that sector S2. Thus the vehicle 10 will not enter a segment occupied by the vehicle 11, and therefore can avoid rear-end collisions resulting from overcoming the vehicle 11.

It is also possible, by employing reciprocal communications via the inter-vehicle communication system 6, to grant permission to the vehicle 10, with a single communication, to travel between the monitoring station and the vehicles, to travel through a travel sector "S10, S9, S8, S7, S6, S5, S4, S3, S2" that is substantially longer than the allowable travel sector "S10, S9, S8, S7, S6, S4" as when using only the monitoring station-vehicle communication systems 23 and 5. Thus the frequentness of communication can be reduced, and monopolization of radio resources held to a minimum.

Also, because the vehicle 10 can travel over a longer distance with a single communication, the vehicle 10 has greater capability of continuous travel without making stops, even in cases where allowable travel sector updating processing is delayed at the monitoring station 20, whereupon work efficiency can be improved.

It is also conceivable that the inter-vehicular interference will involve head-on collisions, when two-way traffic is in effect, and not be limited to collisions occurring at intersections or by overtaking, as discussed in the foregoing.

Figure 16:
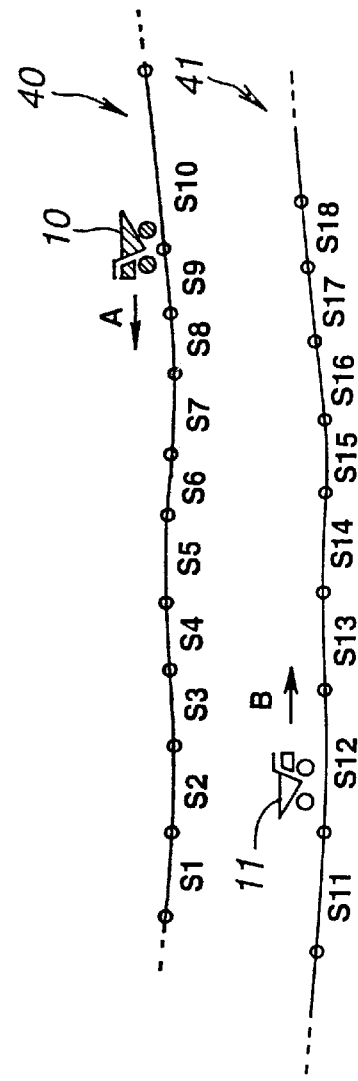
FIG. 16 is a diagram representing vehicle position relationships under conditions differing from those in either FIG. 14 or FIG. 15.

An embodying aspect is next described, with reference to FIG. 16, wherein interference can be avoided when two-way traffic is in effect.

In FIG. 16 is diagrammed a case where two vehicles 10 and 11 are traveling in mutually opposite directions A and B, respectively, on parallel planned travelling paths 40 and 41. This is a case where two-way traffic is in effect over the planned travelling paths 40 and 41.

Now, the monitoring station 20 is cognizant of the current positions S10 and S12 of the vehicles 10 and 11, the current speeds V10 and V12 of the vehicles 10 and 11, and the directions of advance A and B of the vehicles 10 and 11, respectively. From these data, therefore, the monitoring station 20 will judge that the vehicle 10 will pass the oncoming vehicle 11 in segment S5, S6, or S7 (one or the other thereof), will establish, for vehicle 10, a prescribed allowable travel sector containing the sector "S5, S6, S7" where passing will occur, as noted above (step 402), and will transmit directive data to the vehicle 10 directing it to travel through the allowable travel sector containing the oncoming passing sector "S5, S6, S7." At this time, data specifying the other vehicle (vehicle 11) predicted to be encountered in the oncoming passing sector "S5, S6, S7" and data ordering a speed reduction in that oncoming passing sector "S5, S6, S7" are transmitted together to the vehicle 10 (step 404). The vehicle deceleration rates will differ due to differences in vehicle weight, wherefore the particulars of the speed-reduction directive data sent to vehicle 10 may be different according to vehicle weight, so that the rate of deceleration will be made higher as the vehicle weight is lighter.

Similarly, data are transmitted to the vehicle 11 ordering a speed reduction in the oncoming passing sector "S14, S15" corresponding to the oncoming passing sector "S5, S6, S7" of vehicle 10.

In the vehicle 10 that receives these directive data, the vehicle controller 35 will be drive-controlled so that the allowable travel sector defined above is traveled over, in accordance with the particulars of the directive data.

However, upon entering the oncoming passing sector "S5, S6, S7," the vehicle controller 35 is drive-controlled so that the vehicle 10 reduces speed below normal speed, according to the speed-reduction directive data noted above. Similarly, the vehicle 11 will eventually reduce speed in the oncoming passing sector "S14, S15," and hence will reduce speed in correspondence with the oncoming passing sector "S5, S6, S7" of vehicle 10. For this reason, beginning at the point in time where the oncoming passing sector "S5, S6, S7" is entered, the two vehicles 10 and 11 will reduce speed, and thus be able to execute the oncoming pass safely at the oncoming passing point. This does not mean, however, that a speed reduction is enforced over the entire oncoming passing sector "S5, S6, S7." Once both vehicles 10 and 11 have completed the oncoming pass at the passing point, the speeds of the vehicles 10 and 11 are returned to the original normal speeds (even if a vehicle is still traveling in the oncoming passing sector "S5, S6, S7."

In other words, the vehicles that have received data specifying another vehicle from the monitoring station 20 can know who to communicate with (vehicle 11 being the vehicle to communicate with if vehicle 10 is the own vehicle), based on the data specifying the other vehicle. These vehicles 10 and 11, therefore, each receive position data on their opposite-number vehicle by transmissions exchanged therewith via the inter-vehicle communication system 6.

As a result, the vehicles 10 and 11 can each recognize when both vehicles 10 and 11 have completed the oncoming pass at the oncoming passing point. That being so, as soon as it is known by the vehicles 10 and 11 that the oncoming pass has been completed, the vehicle controller 35 is drive-controlled so that the speeds of the vehicles 10 and 11 are restored to the original normal speeds.

Thus, in cases involving two-way traffic, the speeds of the oncoming vehicles 10 and 11 are reduced to a safe speed as soon as the oncoming passing sector "S5, S6, S7" wherein the oncoming pass is expected has been entered, wherefore safe oncoming passes can be executed, and head-on collisions in two-way traffic can be avoided. In addition, once the oncoming pass has been completed, even though the vehicles may still be traveling in the oncoming passing sector "S5, S6, S7," the reduced-speed condition (which causes a loss in work efficiency) is released, so that work efficiency can be enhanced.

It is also permissible to have the monitoring station 20 transmit to the vehicles 10 and 11, together with data directing a speed reduction, data directing at least one of the vehicles (vehicle 10 only, for example) to alter course to the shoulder of the road so as not to interfere with the other vehicle (vehicle 11) in the oncoming passing sector "S5, S6, S7."

In this case, it is preferable that the vehicle directed to alter course toward the shoulder be the vehicle having the lighter vehicle weight (i.e. lighter load). This is because the lighter the vehicle weight, the better the operating balance and safety when altering course, and because less energy is consumed in decelerating and accelerating, which means that fuel can be saved.

When the vehicle 10 enters the oncoming passing sector, the vehicle controller 35 is drive-controlled so that the vehicle 10 reduces speed, as described above, and so that it alters course toward the road shoulder in accordance with the course-change directive data mentioned above. Thus a safe oncoming pass can be negotiated at the oncoming passing point by having the two vehicles 10 and 11 reduce speed, once they enter the oncoming passing sector, and by having one vehicle 10 alter course toward the shoulder. However, this does not mean that the vehicle 10 must travel on the shoulder throughout the entire oncoming passing sector. Once the two vehicles 10 and 11 have completed the oncoming pass at the oncoming passing point, the course of the vehicle 10 is restored to the original course (even if it is still traveling in the oncoming passing sector "S5, S6, S7").

In other words, the vehicles that have received data specifying another vehicle from the monitoring station 20 can know who to communicate with (vehicle 11 being the vehicle to communicate with if vehicle 10 is the own vehicle), based on the data specifying the other vehicle. These vehicles 10 and 11, therefore, each receive position data on their opposite-number vehicle by transmissions exchanged therewith via the inter-vehicle communication system 6.

As a result, the vehicles 10 and 11 can each recognize when both vehicles 10 and 11 have completed the oncoming pass at the oncoming passing point. That being so, as soon as it is known by the vehicle 10 that the oncoming pass has been completed, the vehicle controller 35 is drive-controlled so that the speed of the vehicle 10 is restored to the original normal speed, and so that the course of the vehicle 10 is restored from the shoulder to the original course. For the vehicle 11, only a release of the reduced-speed condition is effected as soon as the oncoming pass has been confirmed.

Thus, when two-way traffic is in effect, as soon as the oncoming passing sector "S5, S6, S7" ("S14, S15") where an oncoming pass is expected has been entered, the speeds of the oncoming vehicles 10 and 11 are reduced to safe speeds, and at least one of the vehicles 10 is made to alter its course toward the shoulder of the road on the side where interference will be avoided. Oncoming passes can therefore be negotiated safely, and head-on collisions avoided in two-way traffic.

The vehicles in view in FIGS. 12–16 may be unmanned vehicles, as in the embodying aspect diagrammed in FIGS. 1–11, or they may be manned vehicles, or even a combination of manned and unmanned vehicles. In FIG. 16, however, if it is a case involving an oncoming pass between an unmanned vehicle and a manned vehicle, in the interest of the safety of the manned vehicle, the unmanned vehicle may be stopped, after the oncoming passing sector has been entered, until the oncoming pass at the oncoming passing point has been completed.

As based on the embodying aspect described above, and diagrammed in FIGS. 12–16, various forms of interference that could occur over the entire planned travelling paths can be prevented before they happen.

However, when a vehicle involved here is a manned vehicle, the particulars of the directive data transmitted by the monitoring station 20 are displayed on the display unit 36, and the operator manipulates various controls as needed to follow those particulars displayed on the display unit 36, thereby manually controlling the steering angle, brakes, transmission, and engine R.P.M., thereby effecting travel, speed reductions, stops, and course alterations, etc.

Now, it might happen that an operator disregards the display and fails to execute the directive particulars. In view of that possibility, if such particulars contained in directive data (directing the vehicle to travel, reduce speed, stop, or alter course, etc.) are not executed within a prescribed length of time after the display of those directive data on the display unit 36, the brakes and engine R.P.M. will be automatically controlled so as to automatically execute these particulars according to the particulars of those directives, and the manned vehicle will automatically be made to travel, reduce speed, stop, or alter course, etc.

Furthermore, in the embodying aspect diagrammed in FIGS. 12–16, it is assumed that the monitoring station 20 constitutes equipment in a separate unit from the vehicles 10, 11, 12, . . . , but embodiment is also possible wherein monitoring equipment having the same functions as, or some of the functions of, the monitoring station 20 is carried on the vehicles.

In the embodying aspect diagrammed in FIGS. 12–16, moreover, the allowable travel sectors on the planned travelling paths 40 are represented as segments, but it is not necessarily imperative to represent them as segments.

In other words, all that is necessary is to have the allowable travel sectors specified on the planned travelling paths 40, and embodiment is possible wherewith the allowable travel sectors are represented as "coordinate positions of travel start points and coordinate positions of travel end points." Alternatively, the allowable travel sectors may be represented as "distances from known points to travel start points and distances from the same known points to travel end points."

INDUSTRIAL APPLICABILITY

The current invention can be applied to the monitoring of vehicles traveling indoors as well as to vehicles traveling outdoors, and may also be applied in unmanned transport systems and the like in factories.

What is claimed is:

1. A vehicle monitor comprising a plurality of vehicles each equipped with vehicle position measurement means for measuring a current position of own vehicle, and with manual or automatic travel-guidance control means for guiding the own vehicle so as to travel along a taught planned travelling path while comparing the current vehicle position measured against a target position on the taught planned travelling path; and a monitoring station that receives position data and speed data transmitted by each of the plurality of vehicles and, based on those received position data, transmits directive data for directing travel of the plurality of vehicles while monitoring positional interrelationships between the plurality of vehicles, characterized in that transceiver means are provided in the monitoring station and in each of the plurality of vehicles, respectively, for sending and receiving the position data and the directive data between the monitoring station and the plurality of vehicles, using a communication system capable of radio communication over distances between the monitoring station and the plurality of vehicles;

the planned travelling paths are divided into a plurality of segments, and lengths of segments in the planned travelling paths are established so as not to become shorter than stopping distances determined from the speed data transmitted from the plurality of vehicles; and determinations are made, in the monitoring station, as to which of the segments of the planned travelling paths each of the plurality of vehicles is present in, by causing the position data to be transmitted to the monitoring station by the transceiver means provided in each of the plurality of vehicles each time a vehicle reaches a dividing point on the planned travelling paths, and directive data are transmitted to each vehicle according to results of those determinations.

2. A vehicle monitor comprising a plurality of vehicles each equipped with vehicle position measurement means for measuring a current position of own vehicle, and with manual or automatic travel-guidance control means for guiding the own vehicle so as to travel along a taught planned travelling path while comparing the current vehicle position measured against a target position on the taught planned travelling path; and a monitoring station that receives position data transmitted by each of the plurality of vehicles and, based on those received position data, transmits directive data for directing travel of the plurality of vehicles while monitoring positional interrelationships between the plurality of vehicles, characterized in that transceiver means are provided in the monitoring station and in each of the plurality of vehicles, respectively, for sending and receiving the position data and the directive data between the monitoring station and the plurality of vehicles, using a communication system capable of radio communication over distances between the monitoring station and the plurality of vehicles;

the planned travelling paths are divided into a plurality of segments;

determinations are made, in the monitoring station, as to which of the segments of the planned travelling paths each of the plurality of vehicles is present in, by causing the position data to be transmitted to the monitoring station by the transceiver means provided in each of the plurality of vehicles each time a vehicle reaches a dividing point on the planned travelling paths and directive data are transmitted to each vehicle according to results of those determinations; and each of the plurality of vehicles is equipped with an obstacle sensor for detecting obstacles, and lengths of the segments in the planned travelling paths are established so that they are never shorter than effective detection distance of the obstacle sensor.

3. A vehicle monitor comprising a plurality of vehicles each equipped with vehicle position measurement means for measuring a current position of own vehicle, and with manual or automatic travel-guidance control means for guiding the own vehicle so as to travel along a taught planned travelling path while comparing the current vehicle position measured against a target position on the taught planned travelling path; and a monitoring station that receives position data transmitted by each of the plurality of vehicles and, based on those received position data, transmits directive data for directing travel of the plurality of vehicles while monitoring positional interrelationships between the plurality of vehicles, characterized in that transceiver means are provided in the monitoring station and in each of the plurality of vehicles, respectively, for sending and receiving the position data and the directive data between the monitoring station and the plurality of vehicles, using a communication system capable of radio communication over distances between the monitoring station and the plurality of vehicles;

the planned travelling paths are divided into a plurality of segments;

determinations are made, in the monitoring station, as to which of the segments of the planned travelling paths each of the plurality of vehicles is present in, by causing the position data to be transmitted to the monitoring station by the transceiver means provided in each of the plurality of vehicles each time a vehicle reaches a dividing point on the planned travelling paths and directive data are transmitted to each vehicle according to results of those determinations; and at least one of the plurality of vehicles is a manned vehicle, in which manned vehicle are provided display means for displaying particulars of directive data transmitted from the monitoring station, and also means for automatically executing the particulars of the directive data when the particulars of the directive data have not been executed before a prescribed length of time has elapsed since display of the directive data on the display means.

4. A vehicle monitor comprising a plurality of vehicles each equipped with vehicle position measurement means for measuring a current position of own vehicle, and with manual or automatic travel-guidance control means for guiding the own vehicle so as to travel along a taught planned travelling path while comparing the current vehicle position measured against a target position on the taught planned travelling path; and a monitoring station that receives position data transmitted by each of the plurality of vehicles and, based on those received position data, transmits directive data for directing travel of the plurality of vehicles while monitoring positional interrelationships between the plurality of vehicles, characterized in that first transceiver means are provided in the monitoring station and in each of the plurality of vehicles for sending and receiving the position data and the directive data between the monitoring station and the plurality of vehicles; and the monitoring station is configured so that, for each vehicle, current position and current direction of advance on the planned travelling paths are found, based on the position data transmitted from the plurality of vehicles, respectively, via the first transceiver means, so that, for each vehicle, an allowable travel sector on the planned travelling paths wherein no interference with other vehicles will occur is found, and so that directive data directing each such vehicle to travel over that allowable travel sector and designating frequentness with which position data are to be transmitted from vehicles in that travel sector are transmitted to the vehicles via the first transceiver means.

5. The vehicle monitor according to claim 4, wherein position data transmission points where the position data are to be transmitted from the vehicles to the monitoring station are established beforehand on the planned travelling paths, and the plurality of vehicles are configured so that they transmit the position data via the first transceiver means to the monitoring station every time they pass one of the position data transmission points on the planned travelling paths.

6. The vehicle monitor according to claim 5, wherein data indicating the position data transmission points are transmitted from the monitoring station to the vehicles via the first transceiver means.

7. The vehicle monitor according to claim 4, wherein transmission intervals or transmission times for transmissions of the position data to be made from the vehicles to the monitoring station are established beforehand, and the plurality of vehicles are configured so that they transmit the position data via the first transceiver means to the monitoring station, either at every transmission interval, or every time the transmission time is reached.

8. The vehicle monitor according to claim 7, wherein data indicating either transmission intervals or transmission times at which the position data are to be transmitted are transmitted from the monitoring station to the vehicles via the first transceiver means.

9. The vehicle monitor according to claim 4, wherein second transceiver means are provided for sending and receiving the position data mutually between the plurality of vehicles, the monitoring station transmits data specifying another vehicle or vehicles wherewith there is a danger of interference with a own vehicle or vehicles, to vehicles for which mutual communications are necessary because of a danger of interference, via the first transceiver means, and vehicles receiving the data from the monitoring station specifying the other vehicle or vehicles mutually exchange own position data with the other vehicle or vehicles, based on data specifying the other vehicle or vehicles, via the second transceiver means, so that own vehicle or vehicles and other vehicle or vehicles do not interfere.

10. The vehicle monitor according to claim 9, wherein the monitoring station is configured so that, when it is predicted that a plurality of vehicles will simultaneously enter a specific sector, on the planned travelling paths, for which entry is allowed by only one vehicle, directive data indicating that an allowable travel sector inclusive of the specific sector is to be traveled over, together with data specifying other vehicles predicted to simultaneously enter the specific sector, are transmitted to the plurality of vehicles predicted to simultaneously enter the specific sector, via the first transceiver means, and vehicles which receive data specifying the other vehicles from the monitoring station mutually exchange own position data with the other vehicles based on data specifying the other vehicles, via the second transceiver means, and determine which vehicle is to enter the specific sector first.

11. The vehicle monitor according to claim 10, wherein the specific sector is either a sector containing an intersection or a one-way sector.

12. The vehicle monitor according to claim 10, wherein vehicles that mutually exchange own position data via the second transceiver means are a vehicle traveling in lead on a travel route toward the specific sector, and a following vehicle traveling in same direction, behind the lead vehicle, on same travel route.

13. The vehicle monitor according to claim 9, wherein the monitoring station is configured so that, when it is predicted that a leading vehicle will enter a specific sector, on the planned travelling paths, for which entry is allowed by only one vehicle, before a following vehicle that will enter later, directive data indicating that an allowable travel sector inclusive of the specific sector is to be traveled over, data specifying the leading vehicle, and position data for the leading vehicle are received via the second transceiver means, whereby data directing that the specific sector is to be entered after confirming that the leading vehicle has left the specific sector are transmitted via the first transceiver means to the following vehicle.

14. The vehicle monitor according to claim 13, wherein the specific sector is either a sector containing an intersection or a one-way sector.

15. The vehicle monitor according to claim 13, wherein vehicles that mutually exchange own position data via the second transceiver means are a vehicle traveling in lead on a travel route toward the specific sector, and a following vehicle traveling in same direction, behind the lead vehicle, on same travel route.

16. The vehicle monitor according to claim 9, wherein, when it is predicted that two vehicles will pass each other in opposite directions on a planned travelling path, the monitoring station transmits, via the first transceiver means, directive data directing that an allowable travel sector containing predicted point of passing be traveled over, data specifying other vehicle predicted to be passed at the point of passing, and data directing that speed should be reduced at the point of passing, to those two vehicles, and the two vehicles are configured so that own position data are mutually exchanged, via the second transceiver means, with the other vehicle, based on data specifying the other vehicle, whereby reduced speed imposition is released upon confirmation that the two vehicles have indeed passed each other at the predicted point of passing.

17. The vehicle monitor according to claim 9, wherein, when it is predicted that two vehicles will pass each other in opposite directions on a planned travelling path, the monitoring station transmits, via the first transceiver means, directive data directing that an allowable travel sector containing the predicted point of passing be traveled over, and data specifying the other vehicle predicted to be passed at the point of passing, to the two vehicles, and also transmits, to at least one of the two vehicles, data directing that course be altered toward shoulder of road at the point of passing, and the two vehicles are configured so that own position data are mutually exchanged, via the second transceiver means, with the other vehicle, based on data specifying the other vehicle, whereby at least the one vehicle can return to course held prior to course change upon confirmation that the two vehicles have indeed passed each other at the predicted point of passing.

18. The vehicle monitor according to claim 4, wherein at least one of the plurality of vehicles is a manned vehicle, in which manned vehicle are provided display means for displaying particulars of directive data transmitted from the monitoring station, and also means for automatically executing the particulars of the directive data when at least particulars of the directive data directing a speed reduction or stop have not been executed before a prescribed length of time has elapsed after display of the directive data on the display means.

19. The vehicle monitor according to claim 4, wherein the monitoring station comprises mobile stations provided in the plurality of vehicles.

* * * * *